United States Patent
Reimer et al.

(10) Patent No.: US 12,449,683 B1
(45) Date of Patent: Oct. 21, 2025

(54) DUAL HEIGHT FUNCTIONAL COMPONENTS IN LITHIUM NIOBATE OPTICAL DEVICES

(71) Applicant: HyperLight Corporation, Cambridge, MA (US)

(72) Inventors: Christian Reimer, Wellesley, MA (US); David J. Starling, Waltham, MA (US); Prashanta Kharel, Cambridge, MA (US); Mian Zhang, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 370 days.

(21) Appl. No.: 17/980,486

(22) Filed: Nov. 3, 2022

Related U.S. Application Data

(60) Provisional application No. 63/287,491, filed on Dec. 8, 2021, provisional application No. 63/275,809, filed on Nov. 4, 2021.

(51) Int. Cl.
*G02F 1/035* (2006.01)
*G02F 1/01* (2006.01)

(52) U.S. Cl.
CPC ............ *G02F 1/035* (2013.01); *G02F 1/0144* (2021.01); *G02F 2202/20* (2013.01)

(58) Field of Classification Search
CPC ...... G02B 6/126; G02B 6/1228; G02B 6/122; G02F 1/2257; G02F 1/035
See application file for complete search history.

(56) References Cited

U.S. PATENT DOCUMENTS

| | | | |
|---|---|---|---|
| 4,448,479 A | 5/1984 | Alferness | |
| 4,553,810 A | 11/1985 | Alferness | |
| 4,961,619 A | 10/1990 | Hernandez-Gil | |
| 5,091,981 A | 2/1992 | Cunningham | |
| 5,157,756 A | 10/1992 | Nishimoto | |
| 5,799,119 A | 8/1998 | Rolland | |
| 6,069,729 A * | 5/2000 | Gill ....................... | G02F 1/2255 385/9 |
| 6,853,793 B1 | 2/2005 | van der Vliet | |

(Continued)

FOREIGN PATENT DOCUMENTS

| CN | 109633608 | 4/2019 |
|---|---|---|
| CN | 111736403 | 2/2022 |

(Continued)

OTHER PUBLICATIONS

Bristow et al., "Depolarization of Single Mode Channel Waveguides on Lithium Niobate", SPIE 0835, pp. 233-237 (Year: 1987).

(Continued)

*Primary Examiner* — Eric Wong
(74) *Attorney, Agent, or Firm* — Van Pelt, Yi & James LLP

(57) ABSTRACT

An electro-optic device is described. The electro-optic device includes an electro-optic component implemented on an electro-optic material having a slab and a ridge portion. The electro-optic component includes a first portion of the slab and a portion of the ridge portion. The first portion of the slab has a first height. The ridge portion has a second height greater than the first height. A passive functionality component is implemented on a second portion of the slab and is optically coupled with the electro-optic component.

21 Claims, 10 Drawing Sheets

(56) References Cited

U.S. PATENT DOCUMENTS

| | | | |
|---|---|---|---|
| 6,934,446 | B2 | 8/2005 | Rasras |
| 7,155,088 | B2 | 12/2006 | Thapliya |
| 7,251,406 | B2 | 7/2007 | Luo |
| 7,333,691 | B1 | 2/2008 | Gill |
| 7,801,400 | B2 | 9/2010 | Sugiyama |
| 8,346,025 | B2 | 1/2013 | Gill |
| 8,600,198 | B2 | 12/2013 | Sudo |
| 9,036,954 | B2 | 5/2015 | Kobrinsky |
| 9,460,740 | B1 * | 10/2016 | Staffaroni ............ G02B 6/0013 |
| 9,465,163 | B2 * | 10/2016 | Kumar ..................... G02B 6/14 |
| 9,759,982 | B2 | 9/2017 | Feng |
| 9,778,417 | B2 | 10/2017 | Cherchi |
| 9,817,186 | B2 * | 11/2017 | Kamei ................. G02B 6/1228 |
| 9,939,709 | B2 * | 4/2018 | Iwatsuka ................ G02B 6/122 |
| 10,241,273 | B2 * | 3/2019 | Tu ............................ G02B 6/34 |
| 10,317,770 | B2 | 6/2019 | Kono |
| 11,181,760 | B2 | 11/2021 | Zhang |
| 11,815,750 | B2 | 11/2023 | Zhang |
| 2003/0068152 | A1 | 4/2003 | Lawrence, III |
| 2004/0037497 | A1 | 2/2004 | Lee |
| 2004/0151423 | A1 | 8/2004 | Izhaky |
| 2006/0210212 | A1 | 9/2006 | Sugiyama |
| 2009/0142019 | A1 | 6/2009 | Popovic |
| 2011/0081107 | A1 | 4/2011 | Sugiyama |
| 2011/0262071 | A1 * | 10/2011 | Mitomi ................. G02F 1/0508 385/2 |
| 2011/0317956 | A1 | 12/2011 | Sudo |
| 2012/0027337 | A1 | 2/2012 | Kondou |
| 2015/0260916 | A1 | 9/2015 | Cherchi |
| 2015/0293427 | A1 | 10/2015 | Goi |
| 2016/0327751 | A1 | 11/2016 | Wu |
| 2017/0351025 | A1 | 12/2017 | Trita |
| 2018/0211685 | A1 | 7/2018 | Mehfuz |
| 2019/0361315 | A1 | 11/2019 | Zhou |
| 2020/0088942 | A1 | 3/2020 | Bian |
| 2020/0359116 | A1 | 11/2020 | Mehrvar |
| 2021/0080796 | A1 | 3/2021 | Kissa |
| 2021/0278597 | A1 | 9/2021 | Sugiyama |
| 2021/0325607 | A1 | 10/2021 | Oka |
| 2023/0375781 | A1 | 11/2023 | Take |

FOREIGN PATENT DOCUMENTS

| | | |
|---|---|---|
| JP | 6476876 | 3/2019 |
| WO | 2018031916 | 2/2018 |

OTHER PUBLICATIONS

Ma et al., "Ultralow loss single layer submicron silicon waveguide crossing for SOI optical interconnect." Optics Express, vol. 21, No. 24, pp. 29374-29382, Year 2013.

Sanchis et al., "Highly efficient crossing structure for silicon-on-insulator waveguides" Optics Letters/ vol. 34, No. 18, pp. 2760-2762 (Year: 2009).

Extended European Search Report for Application 20836102.2, dated Jun. 21, 2023 (Year: 2023).

Chen et al., Broadband Adiabatic Polarization Rotator-Splitter Based on a Lithium Niobate on Insulator Platform, Photonics Research, vol. 9, No. 12 / Dec. 2021, pp. 2319-2324.

Search Report from corresponding International Application No. PCT/US2020/070252, mailed Oct. 22, 2020.

Wang et al., Efficient Polarization Splitter-Rotator on Thin-Film Lithium Niobate, Optics Express, vol. 29, No. 23 / Nov. 8, 2021, pp. 38044-38052.

\* cited by examiner

400A

400B

DUAL HEIGHT FUNCTIONAL COMPONENTS IN LITHIUM NIOBATE OPTICAL DEVICES

CROSS REFERENCE TO OTHER APPLICATIONS

This application claims priority to U.S. Provisional Patent Application No. 63/275,809 entitled DUAL HEIGHT FUNCTIONAL COMPONENTS IN LITHIUM NIOBATE OPTICAL DEVICES filed Nov. 4, 2021, and U.S. Provisional Patent Application No. 63/287,491 entitled DUAL HEIGHT FUNCTIONAL COMPONENTS IN LITHIUM NIOBATE OPTICAL DEVICES filed Dec. 8, 2021, both of which are incorporated herein by reference for all purposes.

BACKGROUND OF THE INVENTION

Electro-optic devices are optical devices that include both optical components (e.g. waveguides) and electrical components (e.g. electrodes). Electro-optic devices may include electro-optic components, in which an electrical signal is imprinted on an optical carrier signal, as well as other components. Electro-optic components are generally configured for a particular optical and electrode signals. For example, optical modulators are electro-optic components that may be optimized for a transverse electric (TE) mode, rather than a transverse magnetic (TM) mode of the optical signal. Modulators may also be optimized for a particular frequency range of electrode signals. Although such configurations may improve performance of the electro-device, other components may be used in connection with the electro-optic components. For example, passive components may be used in connection with an electro-optic components are typically formed using the same configuration as the electro-optic components. Such passive components having the desired performance and functionality may be challenging to fabricate with electro-optic components. Similarly, optical components using other configurations of the optical signal (e.g. TM versus TE mode) may be desired to be used in connection with electro-optic component. Consequently, an improved mechanism for integrating other components with electro-optic devices is desired.

BRIEF DESCRIPTION OF THE DRAWINGS

Various embodiments of the invention are disclosed in the following detailed description and the accompanying drawings.

DETAILED DESCRIPTION

Figure 1A:
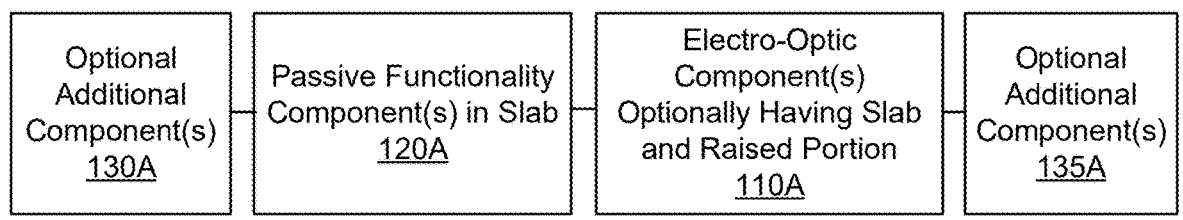
FIGS. 1A-1B depict diagrams depicting embodiments of electro-optic devices 100A and 100B including passive components.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Electro-optic devices include electro-optic components, in which an electrical signal is imprinted on an optical carrier signal, as well as other components. The electro-optic components include optical components such as waveguides and electrical components such as electrodes. The optical components are formed in electro-optic materials for which the application of a field (e.g. via the electrodes) changes the optical properties. For example, one electro-optic component is an optical modulator including a waveguide formed in electro-optic materials and electrodes in proximity to a portion of the waveguide. The waveguide carries an optical signal. Application of an electric field, for example via a radio frequency (RF) signal carried in the electrodes, modulates the properties of the waveguide and, therefore, the optical signal in the waveguide. Thus, the electrical signal in the electrodes is thus imprinted on the optical signal.

Such electro-optic devices are generally optimized to provide a large modulation for a given electrode signal. For example, $V\pi$ is the amplitude of the voltage of the electrode signal required to shift the phase of the optical signal in the waveguide by $\pi$. The electro-optic materials in the electro-optic device are generally configured to reduce $V\pi$ (i.e. to reduce the voltage required for a particular phase shift) of a particular optical signal, such as a transverse electric (TE) or transverse magnetic (TM) mode. For example, for a lithium niobate electro-optic device, the waveguide carrying the optical signal is generally a ridge waveguide. A ridge waveguide includes a wider slab (or thin film portion) and a narrower ridge that rises above the surface of the slab. The ridge confines the mode for the optical signal being transmitted. The slab is utilized to direct the electric field from electrodes to the ridge, modulating its index of refraction. Without the slab, the electric field reaching the ridge/waveguide may be insufficient to provide the desired change in index of refraction and, therefore, the desired modulation of the optical signal.

Although such configurations may improve performance of the electro-optic device, other optical components may be used in connection with the electro-optic component. Passive components are optical components that do not require an input electrical signal to function. Passive components used in connection with an electro-optic component are typically formed using the same configuration as the electro-optic components. Such passive components having the desired performance and functionality may be challenging to fabricate with electro-optic components, particularly in a single electro-optic integrated circuit. Consequently, an improved mechanism for integrating passive and electro-optic devices is desired.

An electro-optic device is described. The electro-optic device includes an electro-optic component implemented on an electro-optic material having a slab and a ridge portion. The ridge portion may be a ridge of a ridge waveguide. The electro-optic material may include lithium niobate and/or lithium tantalate. The electro-optic component includes a first portion of the slab and a portion of the ridge portion. The first portion of the slab has a first height. The ridge portion has a second height greater than the first height. The electro-optic device includes a passive functionality component implemented on a second portion of the slab. The second portion of the slab has a third height not exceeding the first height. In some embodiments, the third height is the same as the first height. The electro-optic component may be selected from an optical modulator, a waveguide, and a detector. The passive functionality component may include a polarization rotation component, a wavelength division multiplexer, a directional coupler, a beam splitter, and/or a compressive dispersive waveguide. In some embodiments, the electro-optic device also includes a tapered region coupling the passive functionality component with the electro-optic component. The tapered region may be configured to reject a first polarization mode (e.g. a TM mode) and accept a second polarization mode (e.g. a TE mode). The electro-optic component may be configured for the second polarization mode. In some embodiments the tapered region may be configured to transform the first polarization (e.g. TM mode) into a higher-order second polarization mode (e.g. TE1). In some embodiments, some or all of the passive functionality components is implemented in the tapered region. In some embodiments, the slab has a very small or zero height (i.e. the slab may be omitted). In such embodiments, the ridge waveguide is effectively a channel waveguide. In such embodiments, the passive functionality component is implemented in electro-optic material(s) having a height less than that of ridge waveguide. Further, a second tapered region may be included to reduce the height. A third section having a third height less than the ridge height may also be present. The passive operation may be performed in (i.e. the passive functionality component may be implemented in) the tapered region and third section. Conversion of the polarization in the tapered region may be particularly useful in embodiments in which the waveguide for the electro-optic component does not have a ridge (i.e. is fully etched/a channel waveguide). In such embodiments, the TM-TE1 conversion may be achieved most effectively in the transition where the thickness changes.

An electro-optic device including a modulator, a tapered region, and a passive functionality component is described. The modulator includes a waveguide and an electrode. The waveguide is formed in at least one electro-optic material having a ridge and, in some embodiments, a slab. The waveguide includes a first portion of the slab and a portion of the ridge. The first portion of the slab has a first height. The ridge has a second height greater than the first height. The tapered region includes a second portion of the ridge and a second portion of the slab (or a shorter portion of the ridge if the slab is omitted). The second portion of the ridge and the second portion of the slab are tapered. The ridge terminates in the tapered region. The passive functionality component is implemented in the tapering region and/or third portion of the slab. In some embodiments, the passive functionality component includes a polarization rotation beam splitter and/or a compressive dispersive waveguide. If the slab is omitted, then the electro-optic modulation is performed for the ridge portion (with the second height). A second tapered region may be included to reduce the height. A third section having a third height less than the ridge height may also be present. The passive operation may be performed done in the tapered region and third section.

A method for providing an electro-optic device is described. The method includes providing at least one electro-optic material including a slab and a ridge portion. The electro-optic material may include at least one of lithium niobate and lithium tantalate. An electro-optic component includes a first portion of the slab and a portion of the ridge portion. The first portion of the slab has a first height, while the ridge portion has a second height greater than the first height. In some embodiments, a very thin slab may be provided or the ridge portion configured such that the slab is omitted. The method also includes providing a passive functionality component implemented on a second portion of the slab (or in a shorter portion of the ridge portion if the slab is omitted). In some embodiments, the method also forms a tapered region coupling the passive functionality component with the electro-optic component. In some embodiments the tapering region also performs an additional passive function. In some embodiments, some or all of the passive component is implemented in the tapered region. The tapered region may be configured to reject a first polarization mode and accept a second polarization mode. The tapering region may be configured to convert TM polarization into a higher order TE polarized mode. The electro-optic component may be configured for the second polarization mode (e.g. TE polarization, either fundamental or higher order spatial mode). In some embodiments, the electro-optic component is selected from a modulator, a waveguide, and a detector. The passive functionality component may include a polarization rotation beam splitter, a wavelength division multiplexer, a directional coupler, and/or a compressive dispersive waveguide. In some embodiments, the second portion of the slab has a third height not exceeding the first height. In some embodiments the first and third heights are the same.

Figure 1B:
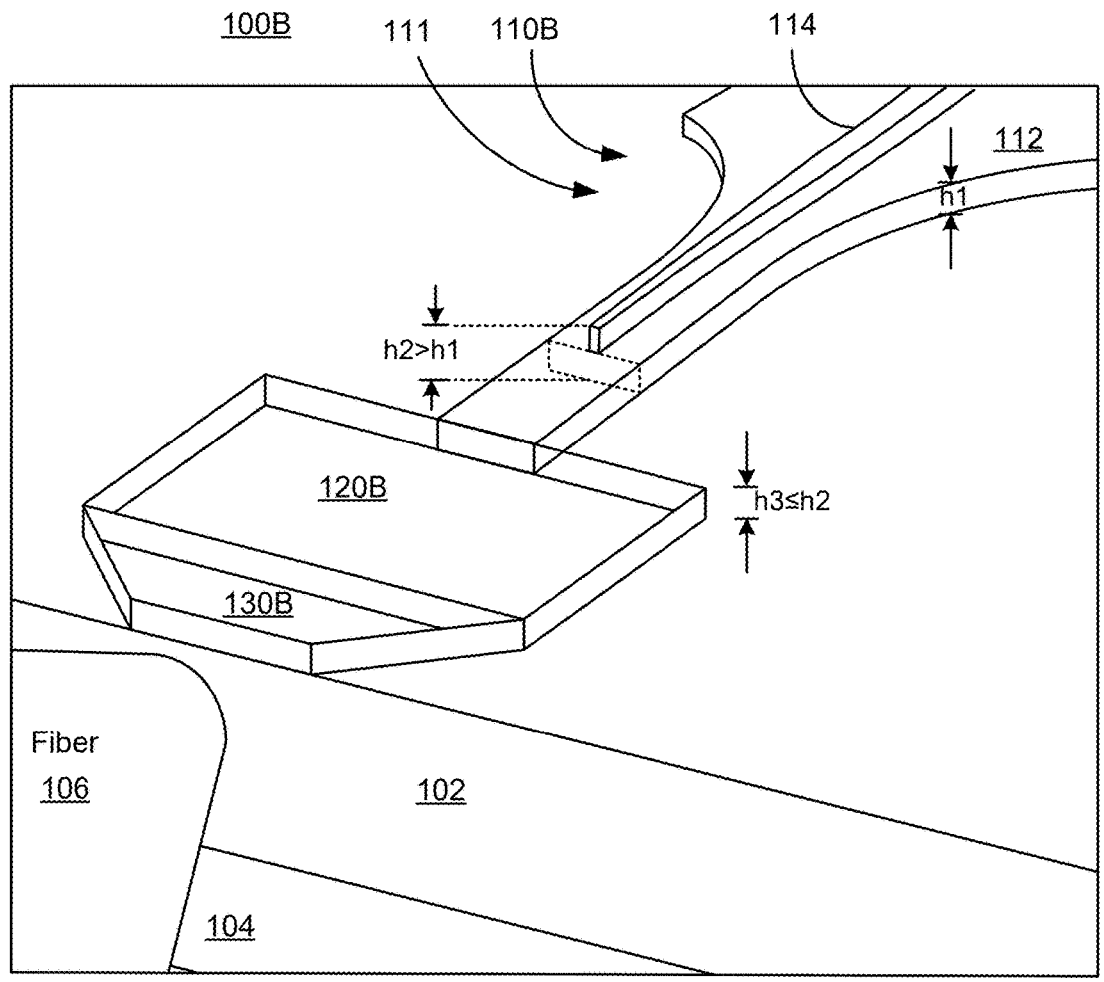

FIGS. 1A-1B depict diagrams depicting embodiments of electro-optic devices 100A and 100B including electro-optic components and passive components. FIG. 1A depicts a block diagram of electro-optic device 100A. FIG. 1B is a perspective view including a portion of electro-optic device 100B. For simplicity, only some portions of the devices 100A and 100B are shown and FIGS. 1A-1B are not to scale.

Electro-optic device 100A may include one or more electro-optic component(s) 110A, passive functionality component(s) 120A, and optional additional component(s) 130A and/or 135A. Electro-optic component(s) 110A imprint an electric signal (e.g. carried by electrodes) onto an optical carrier (e.g. an optical signal carried in a waveguide). Passive component(s) 120A perform linear functions and may operate on the optical signal without requiring an electrical signal. In some embodiments, components 110A, 120A, 130A, and 135A are implemented on the same electro-optic integrated circuit. For example, additional components 130A and 135A may be or include optical couplers residing at the facets of the electro-optic integrated circuit and/or components connecting passive functionality component(s) 120A and/or electro-optic component(s). Optical signals may be input or output via one or more additional optical component(s) 130A and 135A. Although shown as directly connected, one or more additional optical component(s) 130A and/or 135A may be between passive functionality component(s) 120A and electro-optic component(s) 110A.

Electro-optic component(s) 110A and passive functionality component(s) 120A are fabricated from electro-optic material(s). In some embodiments, the electro-optic material(s) are nonlinear. As used herein, an electro-optic material exhibits the electro-optic effect and may have an effect that is at least (e.g. greater than or equal to) 5 picometer/volt. In some embodiments, the electro-optic material has an effect that is at least 10 picometer/volt. In some such embodiments electro-optic material has an effect of at least 20 picometer/volt. The electro-optic material experiences a change in index of refraction in response to an applied electric field. In some embodiments, the electro-optic material is ferroelectric. In some embodiments, the electro-optic material effect includes a change in index of refraction in an applied electric field due to the Pockels effect. Thus, in some embodiments, electro-optic materials possessing the electro-optic effect in one or more the ranges described herein are considered electro-optic materials regardless of whether the effect is linearly or nonlinearly dependent on the applied electric field. The electro-optic material may be a non-centrosymmetric material. Therefore, the electro-optic material may be piezoelectric. In some embodiments, the electro-optic material(s) include one or more of lithium niobate (LN), lithium tantalate (LT), potassium niobate, gallium arsenide, potassium titanyl phosphate, lead zirconate titanate, and barium titanate. In other embodiments, other electro-optic materials having analogous optical characteristics may be used.

Electro-optic component(s) 110A are fabricated from electro-optic material(s) having regions of at least two different heights. In some embodiments, the electro-optic material(s) for electro-optic components 110A include a slab and a raised (e.g., ridge) portion. The slab has a first height, while the ridge portion has a second height greater than the first height. For example, the electro-optic material may have a slab and a ridge. In some embodiments, the slab extends further laterally than the ridge. The electro-optic component(s) 110A may include an optical modulator that includes electro-optic material(s) and electrode(s). The ridge of the electro-optic material(s) acts as a waveguide. The slab portion of the electro-optic material(s) aids in directing the electric field from the electrodes to the ridge. Thus, the waveguide portion of electro-optic component 110A may be a ridge waveguide. In other embodiments, electro-optic component 110A may include a single portion that may have multiple heights. For example, the waveguide portion of electro-optic component 110A may be a channel waveguide. In other embodiments, electro-optic component 110A may have a mixture of ridge and channel waveguide portions.

Passive functionality component(s) 120A are formed from the slab of the electro-optic material(s) is some embodiments. In some embodiments, passive functionality component(s) 120A may be formed in a channel portion of the electro-optic materials. Thus, the electro-optic material(s) for passive functionality component(s) 120A may be considered to be a single layer. In addition, passive functionality component(s) may have a height (or multiple heights) that are less than the height of the ridge. In some embodiments, the height of passive functionality component(s) 120A is the same as the first height of the slab in for electro-optic component(s) 110A. In some embodiments, the height is not more than (e.g. may be less than) the height of the slab. In some embodiments, the height(s) of passive functionality component(s) 120A are not more than (e.g. may be less than) the height of the slab. The passive functionality component(s) 120A may include a ridge ("passive functionality component ridge") and a slab ("passive functionality component slab") in some embodiments. In such embodiments, the passive functionality component slab may have a height that is smaller than the total height of the passive functionality component(s) 120A (i.e. smaller than the height of the passive functionality component ridge). For example, the passive functionality component ridge may have a height that is less than the height of the ridge of electro-optic component(s) 110A. Similarly, the passive functionality component slab may have a height that is less than the slab of electro-optic component(s) 110A. In some embodiments, the passive functionality component slab may be omitted from some or all of passive functionality component(s) 120A. Passive functionality component(s) 120A may provide linear optical functionality. Thus, such passive optical component(s) 120 may not provide electro-optic modulation, or lasing, or detection or generation of optical signals having new frequencies. Passive functionality component(s) 120A may include components such as a polarization rotation beam splitter, a wavelength division multiplexer, a directional coupler, a compressive dispersive waveguide, linear mode converters, other optical couplers, other optical splitters, and/or other optical component(s).

FIG. 1B depicts an embodiment of electro-optic device 100B including electro-optic component 110B, passive functionality component 120B, optional additional component(s) 130B. Other component(s) (not shown) may be part of electro-optic device 100B. Components 110B, 120B, and 130B are analogous to components 110A, 120A, and 130A, respectively. For example, a cladding layer on components 130B, 120B, and 110B, is not shown. Such a cladding layer may be formed of silicon dioxide or other material that has an index of refraction less than the electro-optic material(s) used for electro-optic device 100B. Also shown are substrate 102/104 and fiber 106 which may couple optical signals into or out of electro-optic device 100B. Substrate 102/104 includes a high microwave dielectric constant layer 102 and a lower microwave dielectric constant layer 104. For example, high microwave dielectric constant layer 102 may be silicon dioxide, while low dielectric constant layer 104 may be silicon. Other substrates and/or underlayers, including a single layer substrate, may be used in some embodiments.

Electro-optic component 110B includes a slab 112 and a raised portion, or ridge 114. Slab 112 has a height h1, whereas ridge 114 has a height h2>h1. In some embodiments, h2 is not more than one thousand five hundred nanometers. In some embodiments, h2 is not more than one thousand nanometers. In some embodiments, h2 is not more than five hundred nanometers. In some embodiments, h2 is not more than four hundred and fifty nanometers. In some such embodiments, h2 may be not more than (nominally) four hundred nanometers. For example, h2 may be at least two hundred nanometers and not more than four hundred to four hundred fifty nanometers. In such embodiments, slap 112 may have a height, h1, of not more than two hundred nanometers. In some embodiments, h2 is not more than three hundred nanometers. In some such embodiments, the waveguide h2 is not more than two hundred nanometers. In some embodiments, h2 is not more than one hundred and fifty nanometers. In some embodiments, h2 at least eighty nanometers. Ridge 114 may be used to confine the mode of the optical signal transmitted by electro-optic component 110B, while slab 112 may be used to concentrate an applied electric field at ridge 114. Electro-optic component 110B may include other components. For example, electrode(s) (not shown) may be present. Also shown is taper 111 that accepts some modes and rejects others. Taper 111 may be considered a separate component or part of electro-optic component 110B. Electro-optic component 110B may be optimized for a single polarization, such as the transverse electric (TE) mode, while fiber 106 may carry both TE and transverse magnetic (TM) mode. For example, electro-optic component 110B may be a modulator include x-cut thin-film LN optimized for modulation of the TE mode. Thus, taper 111 may reject the TM mode.

Passive functionality component(s) 120B may be formed from a portion of slab 112. Thus, passive functionality components have a height h3 that does not exceed h2 (h3≤h2). In some embodiments, h3 is the same as h2 (h3≈h2). In some embodiments, height h3 does not exceed h1 (h3≤h1). In some embodiments, the portion of electro-optic materials for passive component(s) 120B form a channel waveguide. Passive functionality component(s) 120B are depicted to indicate the height of the components. Although shown as a rectangle, passive functionality component(s) 120B may have other geometries. For example, passive functionality component(s) 120B may be a ridge waveguides with a remaining slab height h4 (not shown in FIG. 1B) that is less than the total height of passive functionality component(s) 120B (h4<h3), channel waveguide(s) (i.e. waveguides which do not have a ridge and a slab such that h4=0), splitter(s), taper(s), and/or other feature(s) configured to achieve the desired functionality. Also shown is additional component 130B that optically couples passive functionality component(s) 120B with fiber 106.

The thin film nonlinear optical material (e.g. LN and/or LT) may be fabricated for components 110A, 120A, 130A, 135A, 110B, 120B, and 130B utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguides for components 110A, 120A, 130A, 135A, 110B, 120B, and/or 130B, the thin film nonlinear optical material may undergo a physical etch, for example using dry etching, reactive ion etching (RIE), inductively coupled plasma RIE. In some embodiments, a chemical etch and/or electron beam etch may be used. The waveguide may thus have improved surface roughness. For example, the sidewall(s) may have reduced surface roughness. For example, the short range root mean square surface roughness of a sidewall of the ridge may be less than ten nanometers. In some embodiments, this root mean square surface roughness is not more than five nanometers. In some cases, the short range root mean square surface roughness does not exceed two nanometers. Consequently, components 110A, 120A, 130A, 135A, 110B, 120B, and/or 130B may have low losses. In some embodiments, the total optical loss (i.e., the difference between the sum of the optical input power on all inputs and the sum of all optical output power on all outputs when optical device 100A and/or 100B is configured for minimal losses) may be not more than 10 dB for an electrical signal having a frequency range of 50-100 GHz. In some embodiments, the total optical loss may be not more than 7 or 8 dB for the same frequency range.

Electro-optic device(s) 100A and 100B may have improved performance. Passive functionality components 120A and 120B may be fabricated in slab 112 only or ridge 114 only of the electro-optic material(s) such as LN and/or LT. Passive functionality components 120A and 120B may be more readily fabricated and optimized for their functionality separately from electro-optic components 110A and 110B. Similarly, electro-optic components 110A and 110B may also be optimized for their functionality. For example, passive functionality component 120B may be configured to perform its functions with reduced losses, while electro-optic component may provide the desired optical modulation with lower losses. Thus, performance of electro-optic devices 100A and 100B may be improved.

Figure 2:
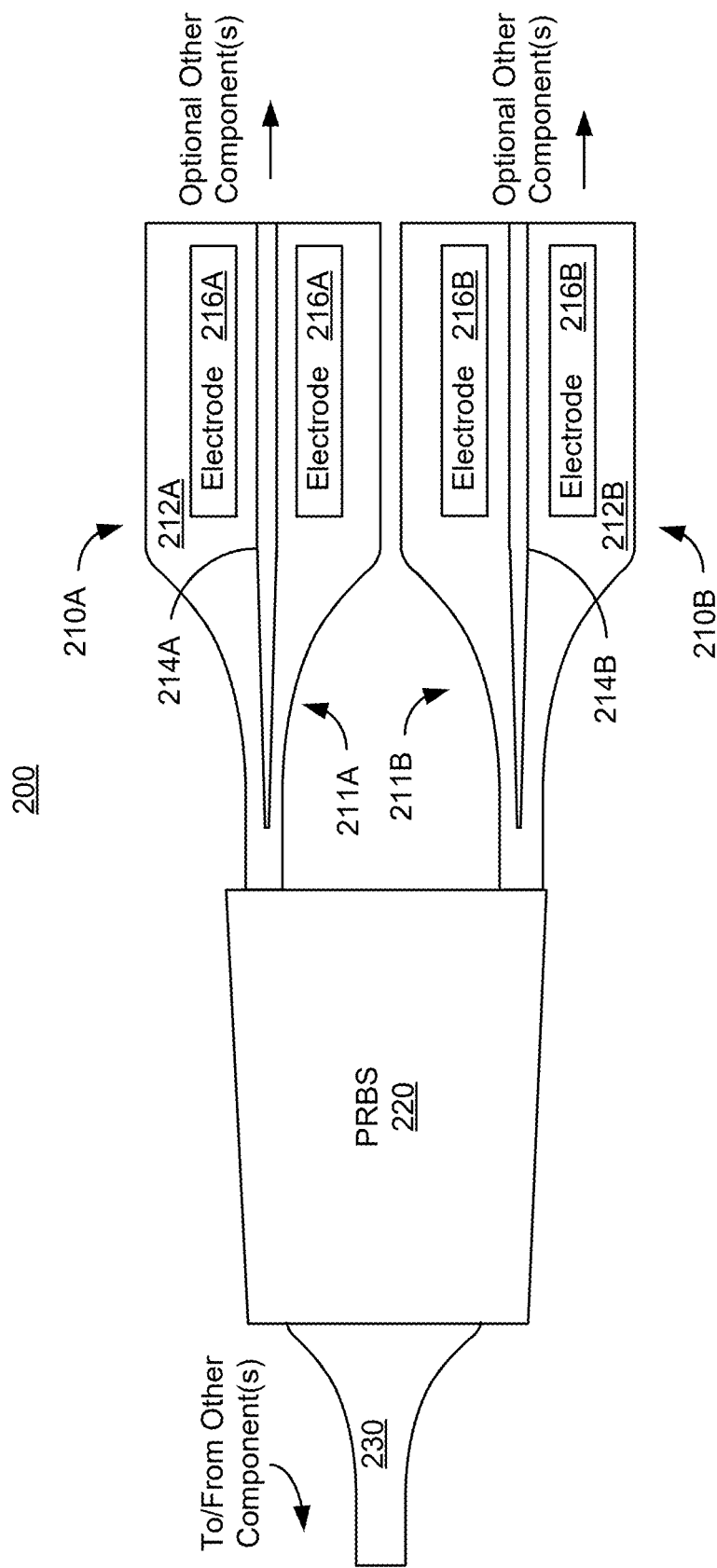
FIG. 2 is a plan view depicting an embodiment of an electro-optic device including a passive component and electro-optic components.

For example, FIG. 2 depicts an embodiment of electro-optic device 200. FIGS. 3A-4B depict information related to electro-optic device 200. FIG. 2 is a plan view depicting electro-optic device 200, which is analogous to electro-optic devices 100A and 100B. For clarity, FIG. 2 is not to scale. Electro-optic device 200 includes electro-optic components 210A and 210B, tapers 211A and 211B, polarization rotation beam splitter (PRBS) 220, and coupler 230 that are analogous to electro-optic components 110A and 110B, taper 111, passive functionality components 120A and 120B, and additional component(s) 130A and 130B. In some embodiments, electro-optic device 200 includes the same nonlinear materials (e.g. LN and/or LT) and/or may be fabricated in the same manner as electro-optic device(s) 100A and/or 100B. Thus, electro-optic device 200 may have analogous total losses in the frequency ranges to those described for optical devices 100A and/or 100B.

Electro-optic components 210A and 210B (collectively or generically 210) are optical modulators. Thus, optical modulator 210A includes slab 212A, ridge 214A that functions as a waveguide, and electrodes 216A. Optical modulator 210A may include other and/or additional structures. Slab 212A and ridge 214A are formed of one or more electro-optic materials. For example, slab 212A and ridge 214A may be formed of LN and/or LT and may have the heights described herein. Slab 212A has a first height, while ridge 214A has a second height greater than the first height. In some embodiments, a layer of LN is deposited and/or etched to form thinner slab 212A and leave taller ridge 214A. In some embodiments, ridge 214A is at least one hundred nanometers and not more than one thousand nanometers high. In some embodiments, ridge 214A is at least two hundred nanometers and not more than six hundred nanometers high. For example, ridge 214A have a height of not more than four hundred nanometers. In some embodiments, ridge 214A has a height of not more than three hundred nanometers. In some embodiments, slab 212A has a height of not more than hundred nanometers in optical modulator 210A. In some embodiments, slab 212A has a height of at least one hundred nanometers and not more than two hundred nanometers. Other heights are possible. The width of ridge 214A is configured to confine the desired mode of the optical signal in optical modulator 210A. For example, ridge 214A may not more than two micrometers wide in some embodiments. Slab 214A is shown as having a width such that slab 214A extends beyond (farther from and closer to modulator 210B) than electrodes 216A. Other widths and/or heights are possible. For example, slab 212A may extend only to electrodes 216A. Optical modulator 210B includes slab 212B, ridge 214B that functions as a waveguide, and electrodes 216B. Optical modulator 210B is analogous to optical modulator 210A. Thus, slab 212B, ridge 214B, and electrodes 216B are configured in an analogous manner to slab 212A, ridge 214A, and electrodes 216A, respectively. Although depicted separately slab 212A and slab 212B (collectively or generically 212) may be formed from the same electro-optic material and may have the same properties. In some embodiments, slab 212A and slab 212B may form a continuous slab in the region of electrodes 216A and 216B.

Optical modulators 210 are configured for a particular mode. For example, optical modulators 210 may each be configured for transmission and modulation of a TE mode of an optical signal. The TE mode is generally the polarization with highest electro-optic coefficient in x-cut thin-film lithium niobate. For this reason, optical modulators 210, and most other devices, are optimized for TE polarization. Optical modulators 210 are also configured to optimize $V\pi$, while reducing losses. For example using the materials and fabrication techniques described herein, $V\pi$ may be 4.5 volts or less for electrical signals in electrodes 216A and 216 having a frequency of 50-100 GHz.

Coupler 230 may be used to optically couple electro-optic device 200 to another device, such as a single mode optical fiber. Thus, the end of coupler 230 may be at the facet of the electro-optic integrated circuit including electro-optic device 200. The region of coupler 230 used to couple with the other device, such as the optical fiber, may be small. In some embodiments, coupler 230 may have a height of at least one hundred nanometers and not more than three hundred nanometers and a width of at least fifty nanometers and not more than two hundred nanometers. In some embodiments, this portion of coupler 230 has a thickness of at least one hundred fifty nanometers and not more than two hundred nanometers and a width of at least eighty nanometers and not more than one hundred fifty nanometers for optical signals having a wavelength of 1550 nanometers or 1310 nanometers. For example, coupler 230 may be nominally one hundred and ten nanometers wide and two hundred nanometers in height. Other widths and/or heights are possible. The optical mode areas for coupler 230 in the coupling region are comparable to TE and TM mode sizes for a single mode optical fiber (or other component to which coupler 230 is optically connected). This configuration allows coupler 230 to couple both TE and TM modes to or from such a device. In some embodiments, coupler 230 may be formed from the slab portion of the electro-optic material being used.

Coupler 230 also includes a taper that is capable of transforming the mode size for both TE and TM mode without adding significant polarization-dependent loss. For example, coupler 230 may widen linearly, exponentially, logarithmically, some combination of them, and/or in another manner. Thus, coupler 230 widens in proximity to PRBS 220. This taper changes the modes size. In some embodiments, the maximum width of coupler 230 in proximity to PRBS 220 may be such that the waveguide/coupler 230 remains single-mode for both TE and TM. Stated differently, coupler 230 may support only the fundamental TE0 and TM0 modes. For example, the width of coupler 230 may taper from at least eighty nanometers (close to the facet) to not more than approximately 1.6 micrometers (in proximity to PRBS 230). In some embodiments, coupler 230 tapers from the sizes described for the coupling region to 0.6-1.2 micrometers for an optical signal having a 1310 nanometer wavelength. In some embodiments, coupler 230 tapers from the sizes described for the coupling region to 0.8-1.3 micrometers for an optical signal having a wavelength of 1550 nanometers. In the example above, coupler 230 may widen from one hundred and ten nanometers wide (and two hundred nanometers in height) to 1.3 micrometers wide (and two hundred nanometers in height). Thus, at the region of coupler 230 proximate to PRBS 220, coupler 230 may carry both TE and TM modes with mode sizes appropriate for PRBS 220. Coupler 230 performs these functions in electro-optic material(s) having a height that is comparable to (e.g. not more than) the height of slab 212. For example, coupler 230 may be formed from the same electro-optic materials as slab 212.

PRBS 220 receives fundamental TE and TM modes from coupler 230 and operates on the modes to provide the optical signals to optical modulators 210 with limited losses. More specifically, PRBS 220 receives an optical signal having TE and TM polarizations, rotates the polarization of one of the modes (e.g. the TM mode), separates the signals into separate paths such that one TE mode is coupled into optical modulator 210A while another TE mode is coupled into optical modulator 210B. For a signal traveling toward coupler 230 from optical modulators 210, PRBS 220 performs the opposite functions: combining two TE modes from optical modulators 210, rotating the polarization of one TE mode, and providing an optical signal having TE and TM modes to coupler 230. PRBS 220 performs these functions in electro-optic material(s) having a height that is comparable to (e.g. not more than) the height of slab 212. For example, PRBS 220 may be implemented in the same electro-optic materials as slab 212. In some embodiments, these functions of the PRBS 220 may be divided into multiple components. For example, a polarization beam rotation component and an asymmetric splitter may be separately provided.

Tapers 211A and 211B (collectively or generically 211) taper ridges 214A and 214B (which terminate in tapers 211). Tapers 211 also taper slabs 212A and 212B. Tapers 211 are also formed of the electro-optic material(s). Thus, optical components having multiple heights (e.g. the ridge height and the slab height) are introduced at tapers 211. As a result, tapers 211 strongly couple TE optical modes between PRBS 220 and optical modulators 210. Tapers 211 are designed to strongly reject TM modes in the embodiment shown. In other embodiments, tapers 211 may be designed in another fashion (e.g. to couple strongly couple TM modes and reject TE modes, to strongly couple TE and TM modes, or for other coupling characteristics).

Electro-optic device 200 may have improved performance. Coupler 230 and PRBS 220 are fabricated in slab 212 and, in the embodiment shown, in the absence of ridges 214A and 214B. In other embodiments, coupler 230 and/or PRBS 220 may have a slab. For example, slab 212A and/or 212B of may have a height of 200 nm and ridge 214A and/or 214B may have a height of 400 nm, while PRBS 220 may have a ridge (not shown in FIG. 2) height of 200 nm (the same as slab 212A and/or 212B) and a slab (not shown in FIG. 2) having a height of 50 nm. Although shown in FIG. 2 as being optimized for only TE modes, coupler 230 and/or PRBS 220 may not be optimized for only TE modes. As a result, both TE and TM modes can be coupled to electro-optic device 200 by coupler 230 without introducing significant losses. For example, PRBS 220 may have a total loss of not more than a 4 dB for both TE and TM modes. The polarization dependent loss, defined as the loss difference from TM mode into one port of PBRS 220 and TE mode into the other power of PRBS 220 may be less than 1.5 dB. Further, PRBS 220 may rotate the TM polarization without significant losses to the TM mode. Efficiency of electro-optic device 200 is, therefore, improved. Tapers 211 are configured for coupling TE modes and filtering TM modes. Optical modulators 210 having slabs 212 and ridges 214A and 214B are optimized for TE modes. The TE modes of optical signals may undergo lower loss, higher modulation in optical modulators 210 and may be coupled to PRBS 220 with reduced losses using tapers 211. Thus, electro-optic device 200 may provide large, low-loss modulation (and lower $V\pi$) of TE modes as well as operate on TM modes without significant losses. Consequently, electro-optic device 200 may have improved performance.

Figure 3A:
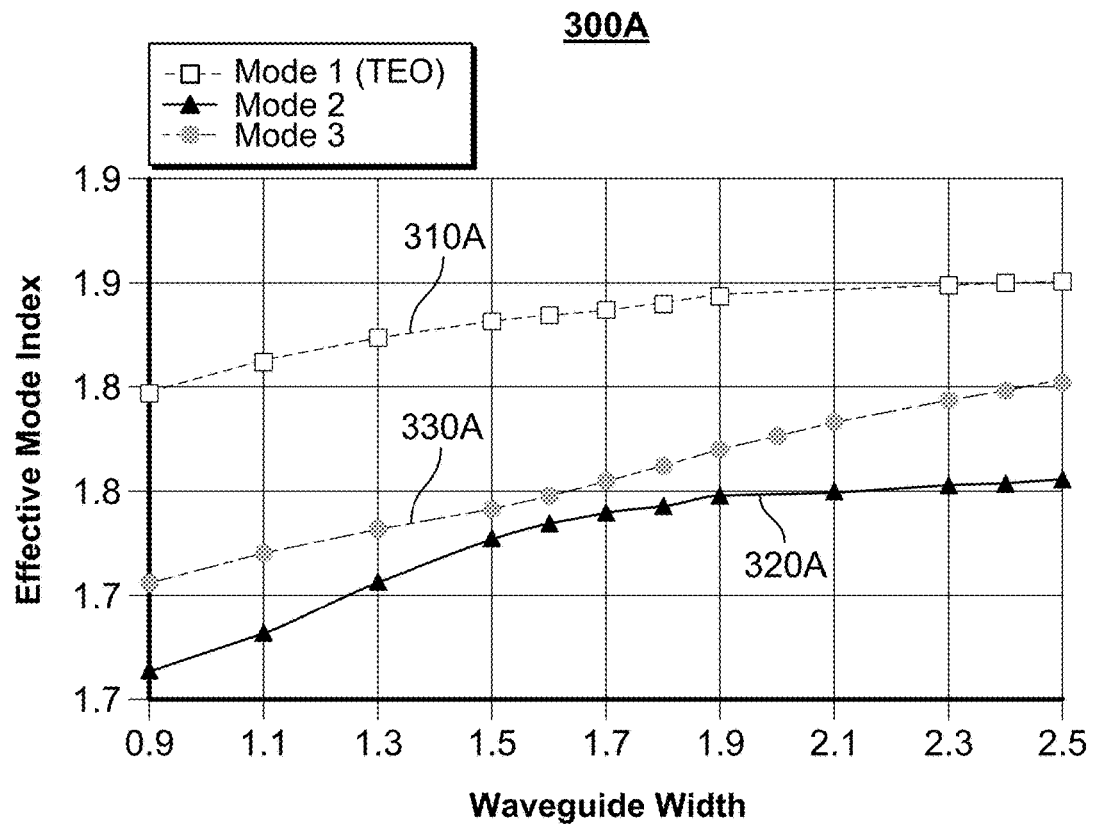
FIGS. 3A-3B depict graphs illustrating the effective mode for various modes and the polarization function versus width of the optical component (slab width) for an electro-optic material.
Figure 3B:
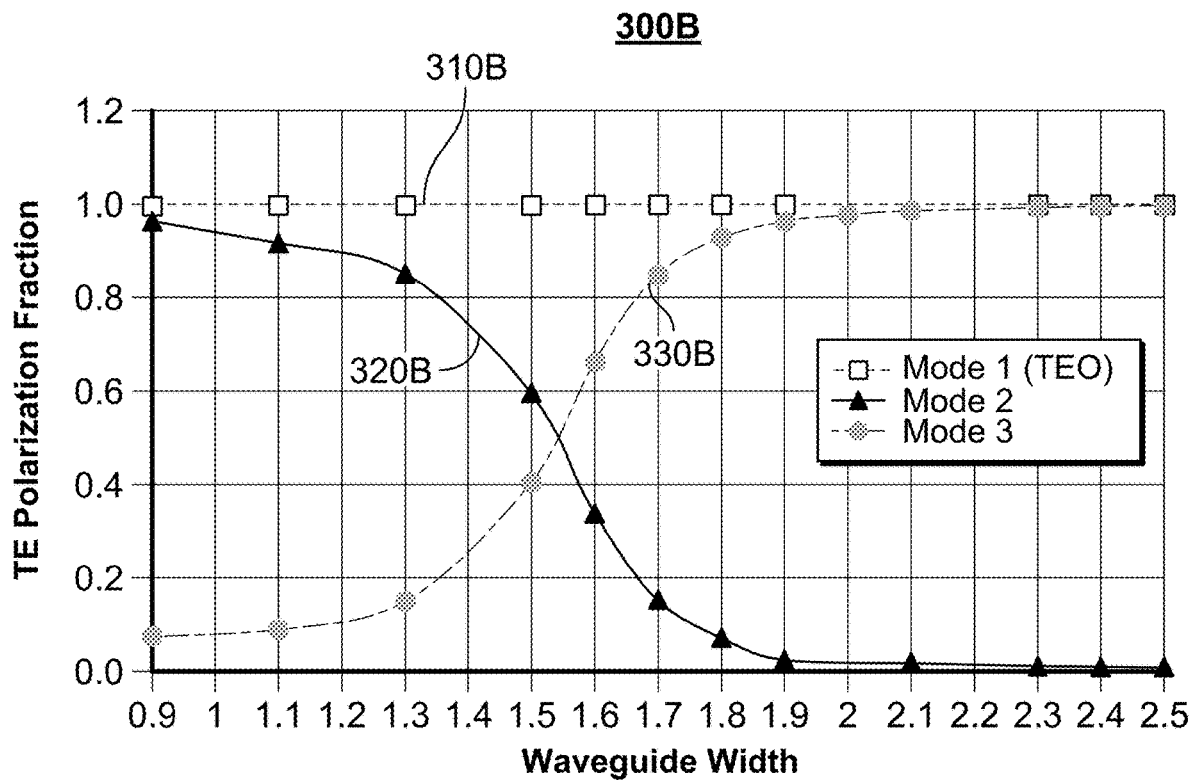

FIGS. 3A, 3B, 4A, and 4B describe performance of a PRBS, such as PRBS 220 for particular wavelength optical signals. FIGS. 3A and 3B include graphs 300A and 300B. Graph 300A depicts the effective index for various modes versus waveguide width for an electro-optic material such as LN. Graph 300B depicts TE mode polarization fraction versus waveguide width. No units are shown because graphs 300A and 300B are for explanatory purposes only. Thus, other embodiments of a PRBS may have different characteristics. Plots 310A and 310B, 320A and 320B, and 330A and 330B are for a first mode, a second mode, and a third mode, respectively. The first optical mode corresponds to plots 310A and 310B. This first optical mode has the highest effective mode index (shown in plot 310A) and remains TE polarized (as indicated by the relatively constant TE polarization fraction in plot 310B). This mode is also referred to as TE0 mode, which is the fundamental TE mode of the system. The second and third modes having mode indexes 320A and 330A, respectively, change their polarization states for different waveguide widths. The third mode (corresponding to plots 330A and 330B) starts as the fundamental TM mode for narrow waveguide widths. This is indicated by a low TE fraction for plot 330B. With increasing waveguide width the polarization fraction transitions from low to high, indicating a polarization change from the TM0 mode to a TE1 mode with increasing waveguide width. This transition of the third mode is used for the polarization rotation beam splitter. The second mode (corresponding to plots 320A and 320B) has the lowest effective index. As indicated by plot 320B, the second mode is a TE1 mode for narrow waveguide width and transitions into a TM0 mode with increasing waveguide width. This mode transition is used to remove TM mode in the transition from wide to narrow widths, as the TM mode is converted into a TE1 mode at narrow waveguide width. This mode is very weakly confined and may be removed.

For example, electro-optic device 200 may be designed as follows when taking into account plots 310A, 310B, 320A, 320B, 330A, and 330B. The taper of coupler 230 tapers to a width such that only TE0 and TM0 are supported in proximity to PRBS 220. Thus, only TE0 and TM0 modes are introduced to PRBS 220. In PRBS 220 the waveguide is gradually tapered through the width region where TM0 and TE1 cross. So the taper that may start at a width smaller than the crossing at 1.65 (e.g. 1.55 µm), and stop at a width greater than the width at the crossing (e.g. 1.75 µm). If the taper is correctly designed, the mode carried by PRBS 220 is transformed from TM0 to TE1.

In addition, mode hybridization, for which the TM0 and TE1 modes are not completely orthogonal, may be used. This can be achieved by adding asymmetry. For example, a slab (for a ridge waveguide, the slab having a height greater than zero in coupler 230 and/or PRBS 220) having angled sidewalls may be used. In some embodiments, a top cladding (not shown in FIGS. 1A-2) on top of the waveguide of coupler 230 and/or PRBS 220 that has a different refractive index than the material below the waveguide. For example, the material below coupler 230 and/or PRBS 220 may be $SiO_2$, while the top cladding may be doped $SiO_2$ with another index, SiON, or air. In some embodiments, some combination of the slab and cladding having differing indices of refraction may be used. In other embodiments, another asymmetry may be used to provide mode hybridization. Once mode hybridization is provided, the taper shape and length may be configured to optimize mode conversion. In the simplest case a linear taper may be used and the length optimized for mode conversion, where the optimal length depends on the coupling strength between the modes.

Figure 4A:
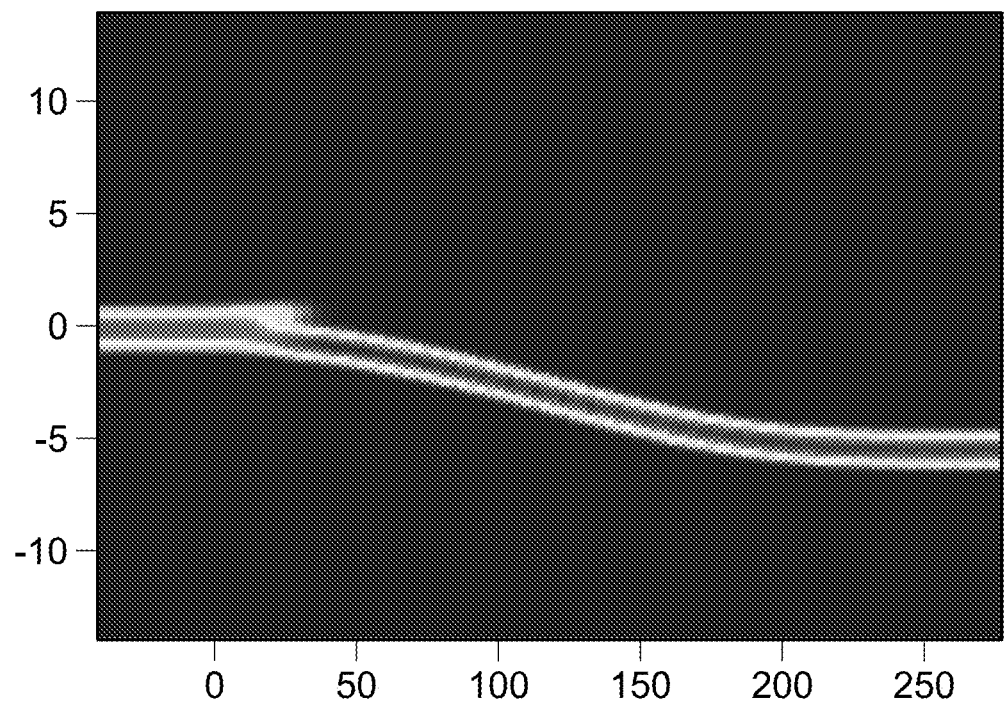
FIGS. 4A-4B depict the optical signal intensity for optical modes of an embodiment of an optical splitter.
Figure 4B:
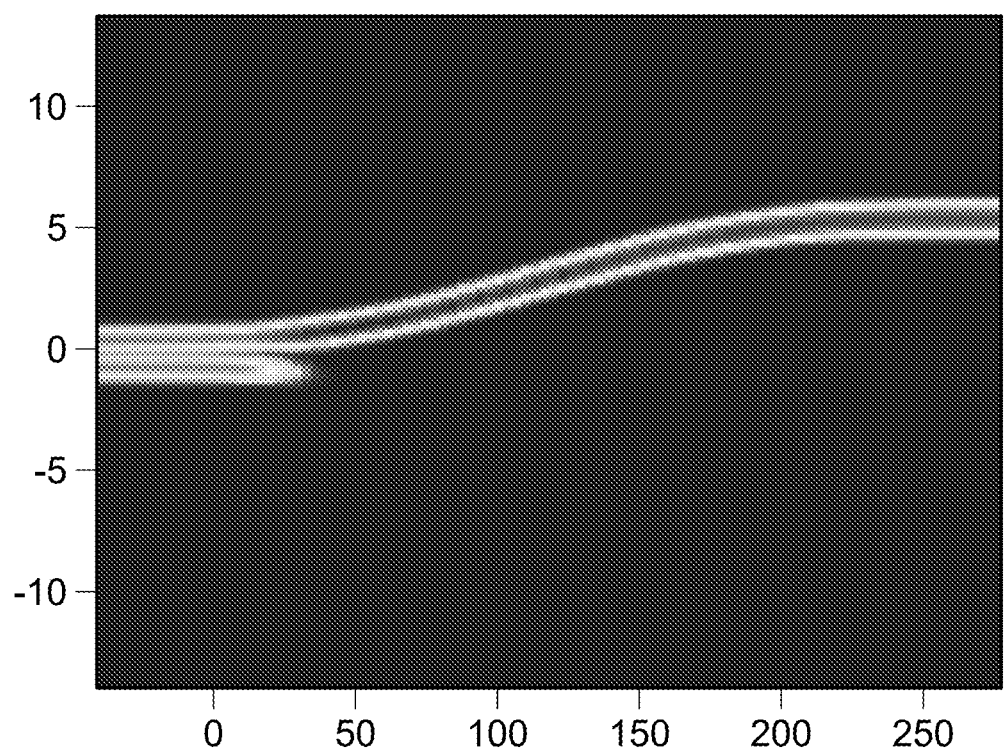

The TE0 and TE1 modes can be separated into different waveguides by an asymmetric splitter, a directional coupler, a multi-mode converted or other mechanism. An asymmetric splitter divides the optical signal off-center and is depicted in FIGS. 4A-4B. FIG. 4A depicts the optical signal intensity for a TE0 mode for a particular optical splitter. FIG. 4B depicts the optical signal intensity for a TE1 mode for the optical splitter. As can be seen in FIG. 4A, the TE0 mode travels on a wider branch of the splitter. FIG. 4B includes multiple maxima before the splitter. Thus, a TE1 mode is present. After the split, the TE1 mode is effectively transformed into a TE0 mode. Thus, a combination of a taper as indicated in FIGS. 3A-3B and an asymmetric splitter indicated in FIGS. 4A-4B may support a TE0 mode in one waveguide, the rotation of a TM0 mode to a TE1 mode and conversion to a TE0 mode in another waveguide. Thus, a PRBS may combine an appropriate taper with an asymmetric splitter.

Figure 5:
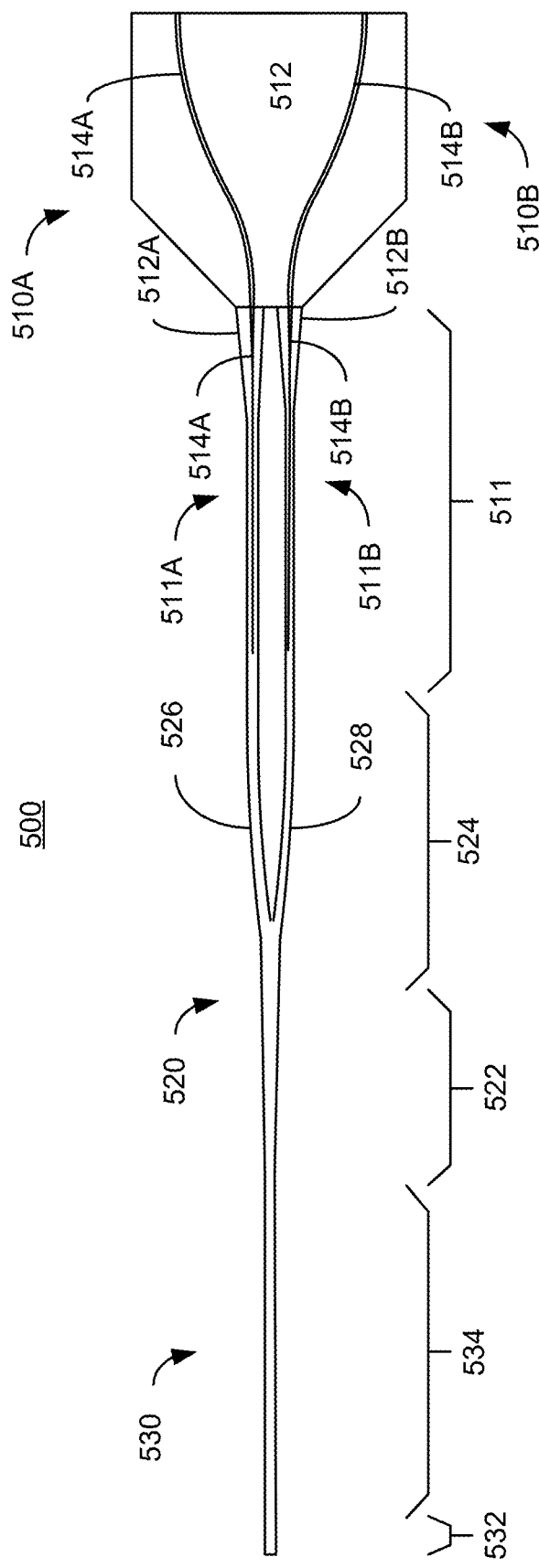
FIG. 5 depicts an embodiment of an electro-optic device including passive and electro-optic components.

FIG. 5 depicts an embodiment of electro-optic device 500 that is analogous to electro-optic devices 100 and 200 and utilizes the properties indicated in FIGS. 3A-4B. FIG. 5 is a plan view of electro-optic device 500. For clarity, FIG. 5 is not to scale. Electro-optic device 500 includes electro-optic components 510A and 510B, tapers 511A and 511B, PRBS 520, and coupler 530 that are analogous to electro-optic components 110A and 110B/210A and 210B, taper 111/211A and 211B, passive functionality components 120A and 120B/PRBS 220, and additional component(s) 130A and 130B/coupler 230. Components 510A, 510B, 522A, 511B, 520 and 530 may be formed from electro-optic material(s) such as LN and/or LT. Further, electro-optic device 500 may share some or all of the benefits, such as low total losses and/or a low $V\pi$, of electro-optic devices 100 and/or 200. In some embodiments, electro-optic device 500 is configured for use with an optical signal having a wavelength of 1550 nanometers. In some embodiments, electro-optic device 500 is configured for use with an optical signal having a wavelength of 1310 nanometers. In some embodiments electro-optic device 500 is part of a dual-polarization intensity modulator. In some embodiments electro-optic device 500 is part of a dual-polarization In-phase Quadrature (IQ) modulator. For simplicity, the underlying substrate and cladding layers are not shown.

Coupler 530 includes a coupling region 532 and a tapered region 534. Coupling region 532 is configured to be optically coupled with another component such as an optical fiber. Further coupling region 532 supports both TE and TE modes. In some embodiments, coupling region 532 is nominally one hundred and ten nanometers wide and two hundred nanometers in height. Other widths and/or heights are possible. Tapered region 534 widens without undue TE or TM mode losses. For example, tapered region 534 may taper exponentially. In some embodiments, tapered region 534 widens from nominally one hundred and ten nanometers near coupling region 534 to nominally 1.3 micrometers near PRBS 520. Tapered region 534 may also have a height of nominally two hundred nanometers. Coupler 530 may be fabricated from slab 512. Coupler 530 may thus have a height that is nominally the same as or less than the height of slab 512.

PRBS 520 includes mode transition region 522 and asymmetric splitter 524. As explained above with respect to graph 300, mode transition region changes width such that the TE0 and TM0 modes are transformed to TE0 and TE1 modes, respectively. If the mode transition from TM0 to TE1 conversion is done within the tapered region 534, then the width of the waveguide is nominally two micrometers for a 400 micrometer thick LN layer. In such an embodiments, asymmetric y-splitter 524 may be implemented on the section of LN that is thicker. In such embodiments, the width of asymmetric y-splitter 524 may be at least 1.8 micrometers and not more than 2.2 micrometers. In some embodiments, the taper for the transition region is linear. For example, the width may change from nominally 1.3 micrometers near tapered region 534 to nominally 1.9 micrometers near asymmetric splitter 524. The height of mode transition region 522 is still nominally two hundred nanometers. Asymmetric splitter 524 includes branches 526 and 528 that split the width off-center (e.g. not at 0.85 micrometers). For example, branch 526 may have a width of nominally 1.2 micrometers, while branch 528 may have a width of nominally 0.7 micrometers. Thus, the TE0 mode travels through branch 526, while the TE1 mode is transformed to a TE0 mode and travels through branch 538. Branches 526 and 528 both taper to the same width (e.g. nominally 1.1 micrometers) in some embodiments. Each branch 526 and 528 of asymmetric splitter 524 has a height of nominally two hundred nanometers. In another embodiments, asymmetric y-splitter 524 may be implemented in the first section of waveguide. In such embodiments, asymmetric y-splitter 524 may have a 400 nanometer-thick ridge and a 200 nanometer thick slab. In other such embodiments, asymmetric y-splitter 524 may be implemented using a 350 nanometer ridge and 175 nanometer thick slab. Thus, various configurations may be used. Mode transition region 522 and asymmetric splitter 524 may be fabricated from (and thus a height that is nominally the same or less than the height of) slab 512. Thus, coupler 530 and PRBS 520 may be viewed as channel waveguides (as opposed to a ridge waveguide) in the embodiment shown. In other embodiments, coupler 530 and/or PRBS 520 may be ridge waveguides. For example, PRBS 520 may include a slab and a ridge while coupler 530 may be a channel waveguide.

Tapers 511A and 511B (collectively or generically 511) are configured to support TE modes at the taller taper section and reject TM modes. Tapers 511 also have dual heights in that slabs 512A and 512B (collectively or generically 512) and ridges 514A and 514B are both present within tapers 511. Slabs 512A and 512B and ridges 514A and 514B taper such that their width increases with increasing distance from PRBS 520. For example, ridges 514A and 514B may terminate at a width of nominally one hundred and fifty nanometers. Ridges 514A and 514B increase in width to eight hundred nanometers in some embodiments. In some embodiments, ridges 514A and 514B taper linearly. Slabs 512A and 512B may taper from 1.1 micrometers at PRBS 520 to six micrometers at modulators 510. In some embodiments, slabs 512A and 512B taper exponentially. Slabs 512A and 512B may remain nominally two hundred nanometers high. However, ridges 514A and 514B have a height (as measured from the bottom of slabs 512A and 512B) that is greater than the height of slabs 512A and 512B. For example, in some embodiments, ridges 514A and 514B are nominally at least three hundred nanometers and not more than four hundred nanometers in height. In some embodiments, only ridges 514A and 514B are present in regions 511A and/or 511B. Stated differently, in some embodiments, tapered regions 511A and 511B are configured as channel waveguides. In such embodiments, ridges 514A and/or 514B may have a reduced height. For example, in such embodiments, ridges 514A and/or 514B may have lower height(s) in tapered region 511 than for electro-optic components 510A and 510B. In some such embodiments, ridges 514A and/or 514B in tapered region 511 have height(s) that do not exceed the height of slab 512 in electro-optic components 510A and 510B.

Electro-optic components 510A and 510B may be optical modulators having ridges 514A and 514B and slab 512. Thus, electro-optic components 510A and 510B have multiple heights. For example, ridges 514A and 514B and slab 512 may have the heights described for tapers 511. Slabs 512A and 512B of tapers 511 may be formed by etching a portion of slab 512. Although not shown, electro-optic components 510A and 510B may include electrodes. Further, electro-optic components 510A and 510B may be optically coupled to other components (not shown). Electro-optic components 510A and 510B are optimized for TE mode optical signals. Thus, electro-optic components 510A and 510B may perform efficiently for the signals coupled in by tapers 511.

Electro-optic device 500 may have improved performance. Electro-optic device 500 may have reduced total loss (e.g., in the ranges described herein) and a lower Vπ (e.g., not exceeding 4.5 volts) over a wide range of electrode signal frequencies (e.g. 50-100 GHz). Coupler 530 and PRBS 520 may each have a single height. In some embodiments, coupler 530 and PRBS 520 have substantially the same height and may be fabricated from slab 512. Coupler 530 and PRBS 520 may be configured for their functions and not optimized for TE modes. In other embodiments, coupler 530 and/or PRBS 520 may have another structure. For example, coupler 530 and/or PRBS 520 may be ridge waveguides. TE and TM modes can thus be coupled to electro-optic device 500 by coupler 530 without introducing significant losses. PRBS 520 may transform the TM polarization in transition region 522 without significant losses to the TE mode. Efficiency of electro-optic device 500 is, therefore, improved. Tapers 511 are configured for coupling TE modes and filtering TM modes. In some embodiments 520 and 511 may be combined into a single element, where TM at the thinner port is transformed into TE1 mode, and TM mode is rejected and is not passed on into the electro-optic device 500. In some embodiments where the polarization mode conversion is happening in the taper 511, the asymmetric splitter to separate fundamental and higher order TE modes is placed in the section with taller waveguides. Electro-optic components 510A and 510B having slabs 512A and 512B and ridges 514A and 514B may be optimized for TE modes. Thus, the TE modes of optical signals may be more strongly modulated and coupled to PRBS 520 using components 510 and 511, while TE and TM modes may be operated on and coupled with other devices using components 520 and 530. Thus, electro-optic device 500 may be configured to operate on TE modes and TM modes without significant losses.

For example, PRBS 520 may have a total loss of not more than a 4 dB for both TE and TM modes. The total loss may not exceed 2 dB in some embodiments. In some embodiments, the polarization dependent loss may be less than 1.5 dB. In some embodiments, this loss includes coupling loss from outside the photonics integrated circuit into the photonics integrated circuit and extinction above 15 dB. Thus, light is incident on coupling region 532 in TE and TM modes and is routed to ridges 514A and 514B in TE modes. If a TE mode enters coupling region 532 it is routed to ridge 514A with below 4 dB total loss, and over 19 dB loss for TE light entering coupling region 532 and being routed to ridge 514B. TM mode light incident on coupling region 532 is routed to ridge 514B with not more than 4 dB loss and ridge 514A with more than 19 dB loss. Moreover, the total loss on the sections having a lower height and transition taper may not exceed 2 dB. Consequently, electro-optic device 500 may have improved performance.

Figure 6:
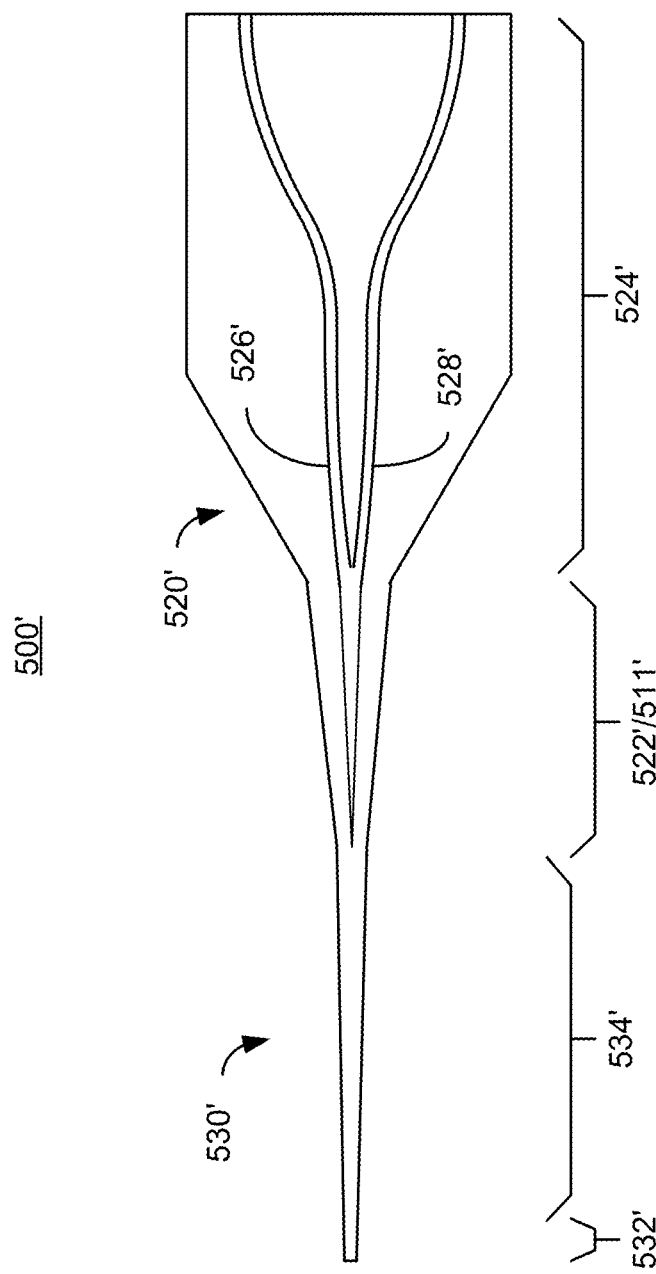
FIG. 6 depicts an embodiment of an electro-optic device including passive and electro-optic components.

FIG. 6 depicts an embodiment of electro-optic device 500' that is analogous to electro-optic device 500 (and thus electro-optic devices 100 and 200). Electro-optic device 500' also utilizes the properties indicated in FIGS. 3A-4B. FIG. 6 is a plan view of electro-optic device 500'. For clarity, FIG. 6 is not to scale. Electro-optic device 500' includes coupler 530' and PRBS 520' that are analogous to coupler 530 and PRBS 520. Components 520' and 530' may be formed from electro-optic material(s) such as LN and/or LT. Further, electro-optic device 500' may share some or all of the benefits, such as low total losses and/or a low Vπ, of electro-optic devices 100, 200 and/or 500. In some embodiments, electro-optic device 500' is configured for use with an optical signal having a wavelength of 1550 nanometers. In some embodiments, electro-optic device 500 is configured for use with an optical signal having a wavelength of 1310 nanometers. For simplicity, the underlying substrate and cladding layers are not shown.

Coupler 530' includes a coupling region 532' and a tapered region 534' that are analogous to coupling region 532 and tapered region 534 of electro-optic device 500. Coupling region 532' supports both TE and TE modes. PRBS 520' includes region 522'/511' and asymmetric splitter 524' having branches 526' and 528'. Branches 526' and 528' are ridge waveguides in the embodiment shown. In PRBS 520', however, mode transition region 522 and taper 511 have been combined into a single region 522'/511'. Thus, instead of having a mode transition region 522 to convert TM into TE1 and later a taper 511 to transition to a thicker region of electro-optic material, these functions are combined. Thus, region 522'/511' is a single taper that has two functionalities: converting TM into TE1 and transitioning to a thicker layer of electro-optic material. Region 522'/511' does block TM modes. More specifically, a TM mode entering from coupler 530 is converted into a TE1 mode. A TM mode entering from asymmetric splitter 524' converted into a TE1 mode, but is lost and rejected. Thus, region 522'/511' is optimized to not transmit TM modes, but does allow TM modes at the thinner side of the taper 522'/511'. Asymmetric splitter 524' has been moved to the thicker electro-optic materials of electro-optic device 500'. Thus, electro-optic device 500' shares the benefits of electro-optic device 500.

Figure 7:
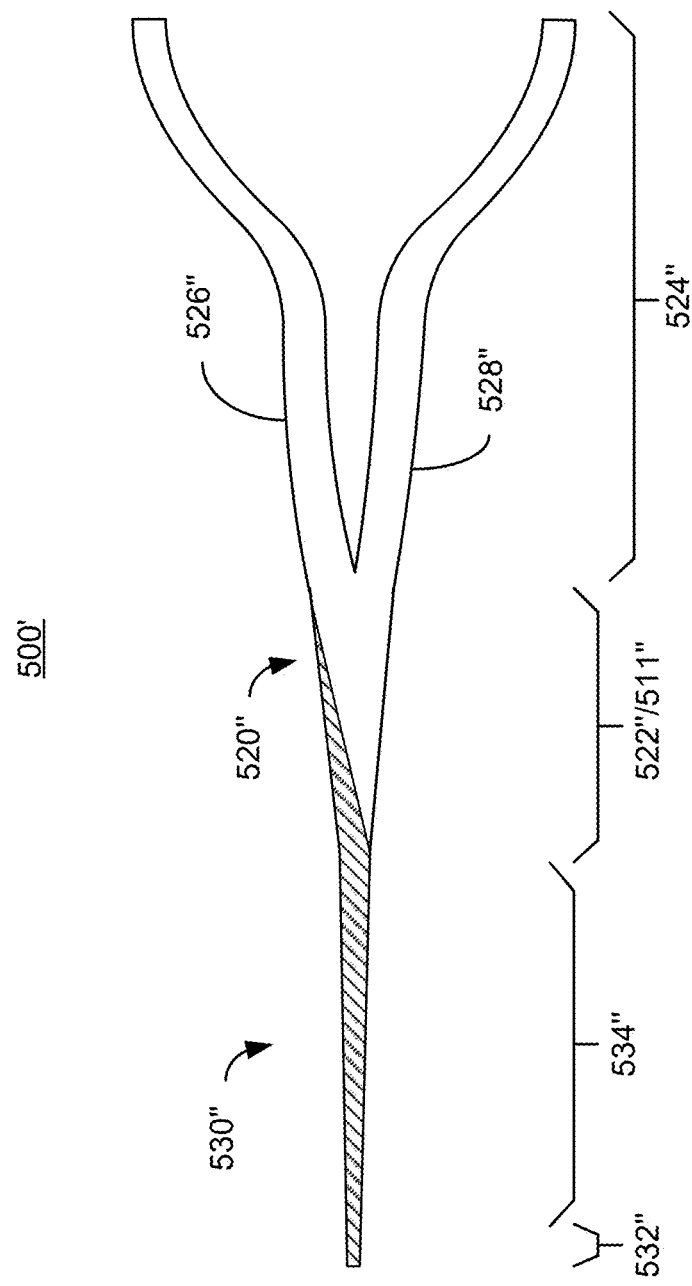
FIG. 7 depicts an embodiment of an electro-optic device including passive and electro-optic components.

FIG. 7 depicts an embodiment of electro-optic device 500" that is analogous to electro-optic device 500 (and thus electro-optic devices 100 and 200) and to electro-optic device 500'. Electro-optic device 500" also utilizes the properties indicated in FIGS. 3A-4B. FIG. 7 is a plan view of electro-optic device 500'. For clarity, FIG. 7 is not to scale. Electro-optic device 500" includes coupler 530" and PRBS 520" that are analogous to coupler 530 and PRBS 520. Components 520" and 530" may be formed from electro-optic material(s) such as LN and/or LT. Further, electro-optic device 500" may share some or all of the benefits, such as low total losses and/or a low Vπ, of electro-optic devices 100, 200 and/or 500. In some embodiments, electro-optic device 500" is configured for use with an optical signal having a wavelength of 1550 nanometers. In some embodiments, electro-optic device 500 is configured for use with an optical signal having a wavelength of 1310 nanometers. For simplicity, the underlying substrate and cladding layers are not shown. However, for at least coupler 530" and PRBS 520" the slab is omitted. Thus, coupler 530" and PRBS 520" may be viewed as ridge waveguides or channel waveguides.

Coupler 530" includes a coupling region 532" and a tapered region 534" that are analogous to coupling region 532 and tapered region 534 of electro-optic device 500. Coupling region 532" supports both TE and TE modes. PRBS 520" includes region 522"/511" and asymmetric splitter 524" having branches 526" and 528". In PRBS 520", mode transition region 522 and taper 511 have been combined into a single region 522"/511" that is analogous to region 522'/511' of electro-optic device 500'. Thus, the mode conversion and transition to a thicker region of electro-optic material are combined in region 522"/511". Region 522"/511" functions in an analogous manner to region 522'/511' of electro-optic device 500'. In the embodiment shown, coupler 530" is thinner, while region 522"/511" increases in thickness. The thinner regions in electro-optic device 500" are depicted as cross-hatched. Asymmetric splitter 524" is in the thicker region of electro-optic materials. However, there is no ridge in region 522"/511" or in asymmetric splitter 524". If there is no slab for electro-optic device 500", then mode conversion takes place in a region where there is a thickness change. Thus, the mode conversion and thickness transition are desired to be combined into single region 522"/511". Although region 522"/511" is shown with a sideways taper (increasing thickness as the width increases), there can be different taper types to convert the thickness. The embodiment shown in FIG. 7 may have some advantages for polarization mode conversion. However, other thickness transitions may be used. The shape of the thickness transitions may be symmetric or asymmetric. For example, the central axis of region 522"/511" may be thick, while the edges of region transition from thin proximate to coupler 530" to thick proximate to asymmetric splitter 524" are thicker. In some embodiments, the total width of region 522"/511" need not change or even increase where the taper occurs. Instead, configurations where the TM and TM1 modes cross during the thickness transition are desired. Thus, electro-optic device 500" shares the benefits of electro-optic device 500 and extends these benefits to couplers and PRBSes that do not utilize slabs.

Figure 8:
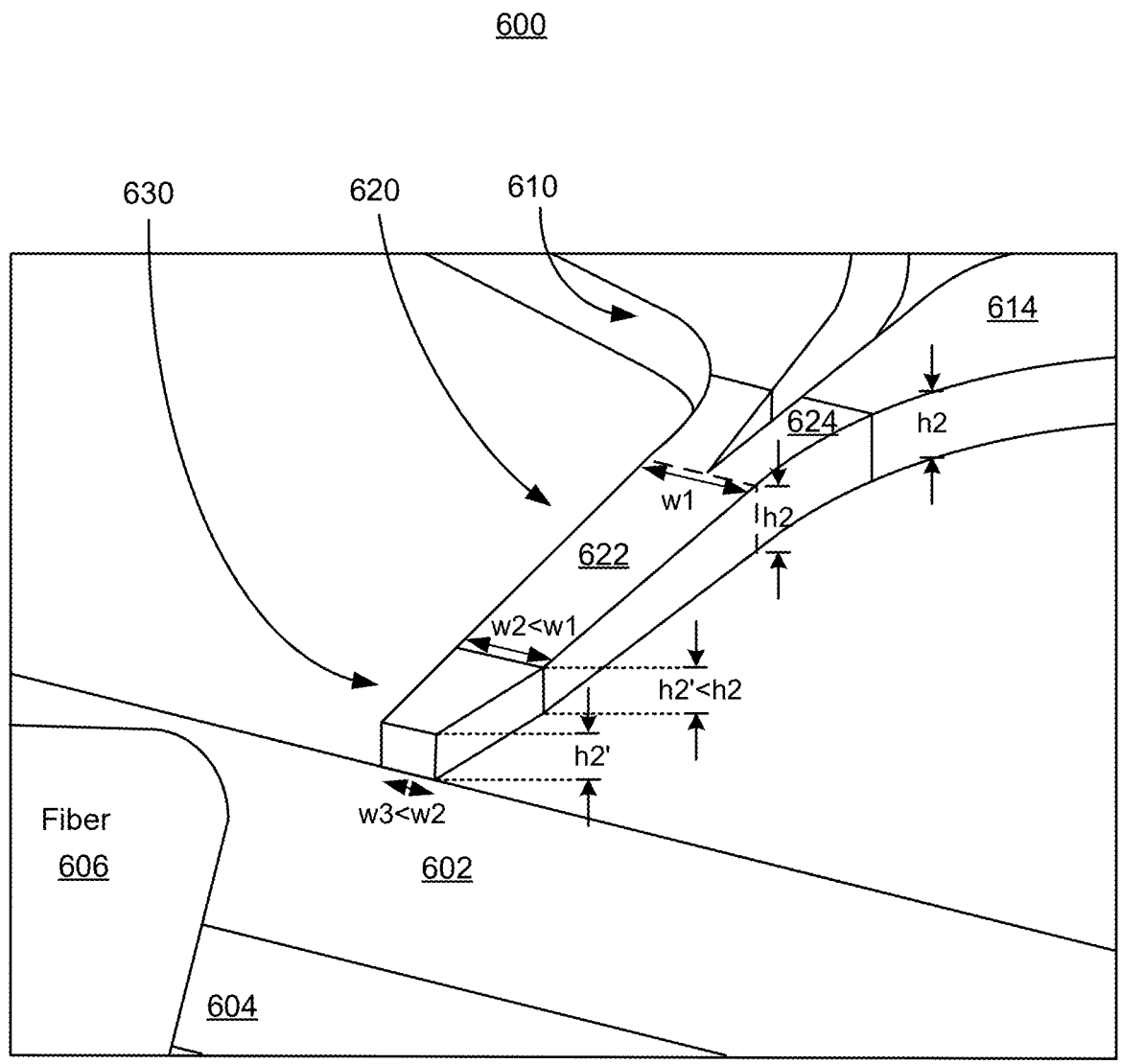
FIG. 8 depicts an embodiment of an electro-optic device including passive and electro-optic components.

FIG. 8 depicts an embodiment of electro-optic device 600 including electro-optic components and passive components. For simplicity, only some portions of the device 600 is shown and FIG. 8 is not to scale. Electro-optic device 600 may include one or more electro-optic component(s) 610, passive functionality component(s) 620, and optional additional component(s) 630. Electro-optic component(s) 610 imprint an electric signal (e.g. carried by electrodes) onto an optical carrier (e.g. an optical signal carried in a waveguide). Passive component(s) 620 perform linear functions and may operate on the optical signal without requiring an electrical signal. In some embodiments, components 610, 620, and 630 are implemented on the same electro-optic integrated circuit. Components 610, 620, and 630 are analogous to components 110/210/510, 120/220/520, and 130/230/530, respectively. Only some components of electro-optic device 600 are shown. For example, a cladding layer on components 630, 620, and 610, is not shown. Also shown are substrate 602/604 and fiber 606 which are analogous to substrate 102/104 and 106, respectively. Other substrates and/or underlayers, including a single layer substrate, may be used in some embodiments.

Electro-optic component 610 may be part of an optical modulator or other electro-optic component and may be analogous to electro-optic component 510. For simplicity, electrode(s) and other portions of electro-optic component 610 are not shown. Passive component 620 is a PRBS analogous to PRBS 510. Additional component 630 is a coupler analogous to coupler 530. Components 610, 620, and 630 include channel waveguide 614. In other embodiments, at least some of waveguide 614 may be a ridge waveguide (i.e. may include slab and ridge portions). For example, in some embodiments, the portion of waveguide 614 in electro-optic component 610 may be a ridge waveguide.

PRBS 620 utilizes the properties depicted in FIGS. 3A-4B. Thus, PRBS 620 includes transition region 622 and asymmetric splitter 624 that are analogous to transition region 522 and asymmetric splitter 524. However, electro-optic device 620, transition region 622 also functions as part of tapered region of waveguide 614. Thus, waveguide 614 tapers and reduces in height in PRBS 620. As part of PRBS 620, waveguide 614 both reduces in width closer to the edge/fiber 606 and reduces in height from h2 to h2'. In the embodiment shown, the width of waveguide 614 reduces from w1 to w2 in this region. Thus, electro-optic component 610 has height h2 and width w1 at the interface with PRBS 620, while PRBS 620 has height h2' and width w2 at the interface with coupler 630. In the embodiment shown, coupler 630 reduces in width to w3 and height h2' at the facet of electro-optic device 600.

Electro-optic device 600 may have improved performance. Electro-optic device 600 may share the benefits described herein, such as a reduced total loss and lower Vπ over a wide frequency range. PRBS 620 may be more readily fabricated and optimized for its functionality separately from electro-optic component 610. Similarly, electro-optic component 610 may also be optimized for its functionality. For example, passive functionality component 620B may be configured to perform its functions with reduced losses, while electro-optic component may provide the desired optical modulation with lower losses. Thus, performance of electro-optic device 600 may be improved.

Figure 9A:
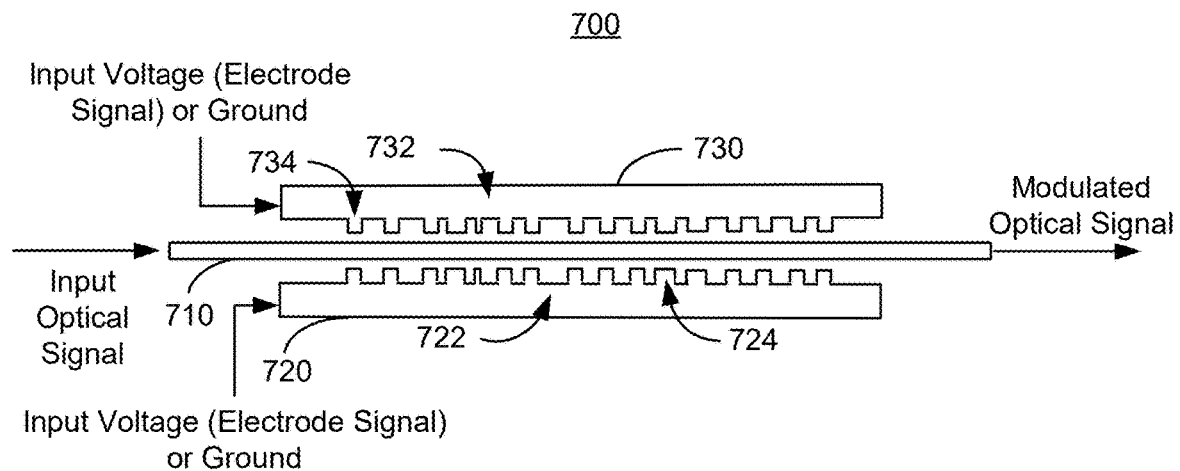
FIGS. 9A-9B depict an embodiment of an optical device having engineered electrodes.
Figure 9B:
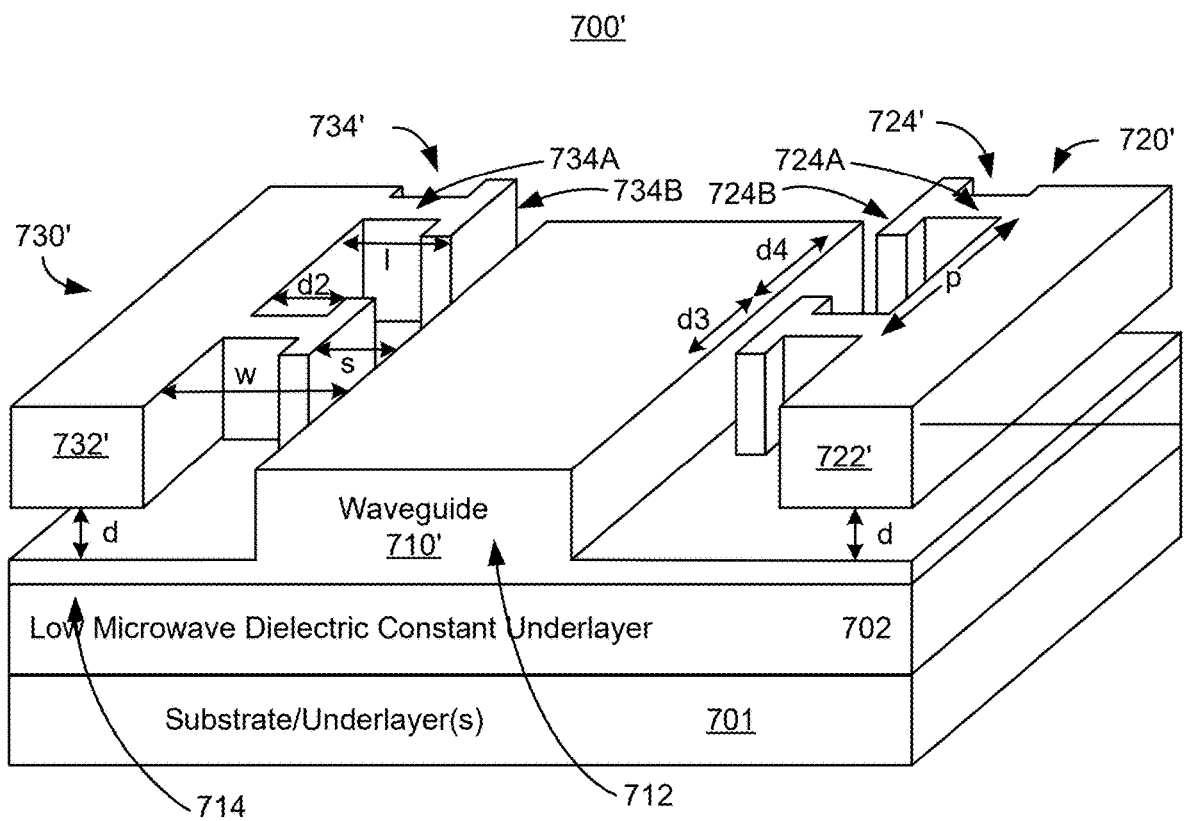

FIGS. 9A-9B depict embodiments of a portion of optical devices 700 and 700'. FIG. 9A depicts a plan view of optical device (i.e. electro-optic device) 700 including waveguide 710 and electrodes 720 and 730. FIG. 9B depicts a perspective view of optical device 700' which is analogous to optical device 700. In particular FIGS. 9A and 9B depict portions of the waveguide and electrode(s) that may be used in optical channels 110, 210 and/or 310 of optical devices 100, 200, and/or 300.

Optical devices 700 and 700' may be part of an optical modulator or other devices with an electro-optic response (e.g. in picometers per volt) in the thin film plane (e.g. x-cut or y-cut lithium niobate) or perpendicular to the thin film plane. In other embodiments, an optical device may be part of an optical modulator with an electro-optic response (e.g. in picometers per volt) out of plane of the thin film plane (e.g. z-cut lithium niobate). Optical devices may be part of an optical transceiver, such as optical transceiver 185.

Referring to FIG. 9A, optical device 700 includes waveguide 710 and electrodes 720 and 730. Waveguide 710 is used to transmit an optical signal. More specifically, waveguide 710 receives an input optical signal and outputs a modulated optical signal. Electrode(s) 720 and/or 730 carry an electrode signal that applies a time varying electric field to waveguide 710. This electric field alters the index of refraction of waveguide 710. In some embodiments, electrode 720 carries an electrode signal, such as a microwave signal, while electrode 730 is a ground. In some embodiments, electrode 730 carries an electrode (e.g. microwave) signal, while electrode 720 is ground. In some embodiments, both electrodes 720 and 730 carry electrode signals. Other configurations are also possible. Thus, electrodes 720 and 730 combine with waveguide 710 to provide a modulated optical signal. Electrodes 720 and 730 are drawn around waveguide 710 to indicate that waveguide 710 experiences an applied electric field between 720 and 730, but does not indicate the physical locations of electrode 720 and 730. For example, it is possible to have electrode 720 directly on top or below the waveguide while 730 is on one side.

Waveguide 710 is depicted as a having a rectangular footprint and extending only between electrodes 720 and 730. Waveguide 710 may have other configurations. For example, waveguide 710 may include a thin film portion that may extend under electrode(s) 720 and/or 730 and a ridge 712 between electrodes 720 and 730. Waveguide 710 includes at least one optical material possessing an electro-optic effect as described above and may include LN and/or LT.

In some embodiments, waveguide 710 is a low optical loss waveguide. For example, waveguide 710 may have a total optical losses described above with respect to FIG. 1. In some embodiments, the nonlinear optical material for waveguide 710 consists of LN. In some embodiments, the nonlinear optical material for waveguide 710 consists of LT. Such nonlinear optical materials may have inert chemical etching reactions for conventional etching using chemicals such as fluorine, chlorine or bromine compounds. In some embodiments, the nonlinear optical material(s) include one or more of LN, LT, potassium niobate, gallium arsenide, potassium titanyl phosphate, lead zirconate titanate, and barium titanate. In other embodiments, other nonlinear optical materials having analogous optical characteristics may be used. Waveguide 710 may also have an analogous geometry (e.g. thicknesses, lengths, and/or widths) to those described for waveguides in optical channels 110.

Various other optical components may be incorporated into waveguide 710 to provide the desired phase modulation, polarization modulation, intensity modulation, IQ modulation, other modulation and/or other functionality. For example, waveguide 710 may have wider portion(s) (not shown in FIG. 9A) for accommodating multiple modes and narrower portions for coupling to optical fibers. In some embodiments (not shown in FIG. 9A), waveguide 710 may include splitters to divide the optical signal into multiple branches for modulation and recombine the modulated optical signals for output. Thus, waveguide 710, as well as electrodes 720 and 730, may be configured to provide the desired functionality.

A portion of waveguide 710 is proximate to electrodes 720 and 730 along the direction of transmission of the optical signal (e.g. from the input of the optical signal through waveguide 710 to the modulated optical signal output). This portion of the waveguide may have a variety of lengths. In some embodiments, the portion of waveguide 710 close to electrodes 720 and 730 is at least two millimeters in length. In some embodiments, this portion of waveguide 710 is at least five millimeters and not more than ten millimeters long. Other embodiments may have this portion of the waveguide 710 longer. The portion of waveguide 710 proximate to electrodes 720 and 730 may have a length greater than two centimeters. In some embodiments, the length of the portion of waveguide 710 proximate to electrodes 720 and 730 is at least 2.5 cm. In some embodiments, the length of this portion of waveguide 710 is at least three centimeters. Such lengths are possible at least in part because of the low optical losses per unit length for waveguide 710 described above. Because waveguide 710 can be made longer, the total optical modulation may be provided through the electric field generated by electrodes 720 and 730 may be larger. Further, because of the low optical losses and low microwave losses (described below), the desired optical modulation (e.g. change in index of refraction) may be achieved with a signal input to the electrode(s) 720 and/or 730 having a lower voltage. For example, $V\pi$ is the half wave voltage, or the amplitude of the input electrode signal required to shift the phase of the optical signal by. In some embodiments, $V\pi$ is not more than six volts for electrode signals in the 50-100 GHz range. In some embodiments, $V\pi$ is not more than 7.5 volts for electrode signals in the 50-100 GHz range. In some embodiments, $V\pi$ is not more than three volts for signals in the 50-100 GHz range. In some embodiments, $V\pi$ is on the order of voltages provided via CMOS circuitry, for example in the range of 0.5 volts through 4.5 volts for signals in the 50-100 GHz range. For example, $V\pi$ may be not more than 4.5 volts at ten GHz. Thus, $V\pi$ is not more than 4.5 volts in some embodiments. In some such embodiments, $V\pi$ is not more than 4 volts for signals in the 50-100 GHz range. Other voltages for other frequency ranges are possible. Thus, performance of optical modulator 710 may be improved.

Further, the portion of waveguide 710 proximate to electrodes 720 and 730 may have an optical mode cross-sectional area that is small. In some embodiments, the optical mode cross-sectional area is less than 3 multiplied by the square of the wavelength of the optical signal in the nonlinear optical material(s) (e.g. 22). In some embodiments, the optical mode cross-sectional area is less than 2 multiplied by the square of the wavelength of the optical signal in the nonlinear optical material(s). In some embodiments, the optical mode cross-sectional area is less than 4.5 multiplied by the square of the wavelength of the optical signal in the nonlinear optical material(s). In some embodiments, the optical mode cross-sectional area is less than 4 $\mu m^2$. In some such embodiments, the optical mode cross-sectional area is not more than 3 $\mu m^2$. In some embodiments, such a small optical mode cross-sectional area may be provided using thin films and fabrication technologies described herein. The optical mode cross-sectional area may also allow for the low optical losses described herein.

Electrodes 720 and 730 apply electric fields to waveguide 710. Electrode 720 includes a channel region 722 and extensions 724 (of which only one is labeled in FIG. 9A). Electrode 730 includes a channel region 732 and extensions 734 (of which only one is labeled in FIG. 9A). In some embodiments, extensions 724 and/or 734 may be omitted from electrode 720 and/or electrode 730, respectively. Extensions 724 and 734 protrude from channel regions 722 and 732, respectively. Thus, extensions 724 and 734 are closer to waveguide 710 than channel region 722 and 732, respectively, are. Extensions 724 and 734 shown in FIG. 9A are simple rectangular protrusions. In some embodiments, extensions 724 and 734 may have a different shape. For example, extension(s) 724 and/or 734 may have an L-shaped footprint, a T-shaped footprint and/or another shaped footprint. Regardless of the shape, at least part of each of the extensions 724 and 734 is closer to waveguide 710 than channel regions 722 and 732, respectively. The distribution (e.g. pitch) and width of extensions 724 and 734 are also irregular. In some embodiments, the distribution and/or width of extensions 724 and/or 734 may be regular. The distance between waveguide 710 and extensions 724 and 734 is shown as constant. In some embodiments, this distance may vary. Similarly, the distance between waveguide 710 and channel 722 and 732 is shown as constant. In some embodiments, this distance may vary. Electrodes 720 and 730 are shown as symmetric. In some embodiments, electrodes 720 and 730 are asymmetric. For example, extensions 734 may be omitted, while extensions 724 are present.

Extensions 724 and 734 protrude from channel regions 722 and 732, respectively, and reside between channel regions 722 and 732, respectively, and waveguide 710. As a result, extensions 724 and 734 are sufficiently close to waveguide 710 to provide an enhanced electric field at waveguide 710. Consequently, the change in index of refraction induced by the microwave signal carried in electrodes 720 and/or 730 is increased. In contrast, channel regions 722 and 732 are spaced further from waveguide 710 than the extensions 724 and 734. Thus, channel region 722 is less affected by the electric field generated by electrode 730/ extensions 734. Electrical charges have a reduced tendency to cluster at the edge of channel region 722 closest to electrode 730. Consequently, current is more readily driven through central portions channel region 722 and the electrode losses in channel region 722 (and electrode 720) may be reduced. Similarly, channel region 732 is further from electrode 720. Channel region 732 is less affected by the electric field generated by electrode 720/extensions 724. Electrical charges have a reduced tendency to cluster at the edge of channel region 732 closest to electrode 720. Consequently, current is more readily driven through channel region 732 and the electrode losses in channel region 732 (and electrode 730) may be reduced. Because microwave signal losses through electrodes 720 and 730 may be reduced, a smaller driving voltage may be utilized for electrode(s) 720 and/or 730 and less power may be consumed by optical device 700. In addition, the ability to match the impedance of electrode 720 with an input voltage device (not shown in FIG. 9A) may be improved. Such an impedance matching may further reduce electrode signal losses for optical device 700. Moreover, extensions 724 and 734 may affect the speed of the electrode signal through electrodes 720 and 730. Thus, extensions 724 and 734 may be configured to adjust the velocity of the electrode signal to match the velocity of the optical signal in waveguide 710. Consequently, performance of optical device 700 may be improved.

Electrode(s) 720 and/or 730 may be fabricated using deposition techniques, such as evaporation and/or electroplating, and photolithography to shape extensions 724 and/or 734 of electrode 720 and/or 730. The resulting electrode 720 and/or 730 may have a lower frequency dependent electrode loss. In some embodiments, the frequency dependent electrode power loss for a particular frequency window (e.g. at least 40 GHz) in a frequency range between DC and five hundred GHz can be as low as 0.8 dB per square root of the electrode signal frequency per centimeter, where the electrode signal frequency is measured in GHz. The frequency dependent electrode loss is less than 0.5 dB per square root of an electrode signal frequency per centimeter in other embodiments. The electrode signal frequency is measured in GHz and the frequency window may be at least 40 GHz. The frequency dependent electrode loss is less than 0.3 dB per square root of an electrode signal frequency per centimeter in other embodiments. The electrode signal frequency is measured in GHz and the frequency window may be at least 40 GHz. In some embodiments, the electrode has an absorption electrode loss for a frequency window in an electrode signal frequency from DC to not more than five hundred GHz. The absorption electrode loss is less than 0.005 dB per GHz per centimeter and the frequency window is at least 40 GHz in some embodiments. In some embodiments, the frequency dependent electrode power loss for the same frequency window and frequency range can be as low as 0.75 dB per square root of the electrode signal frequency per centimeter for the particular frequency window (e.g. 40 GHz or more). In some embodiments, the electrode has an absorption electrode loss. In some embodiments, the absorption electrode loss a particular frequency window (e.g. 40 GHz or more) in a frequency range between DC and five hundred GHz is less than 0.02 dB per GHz per centimeter. In some embodiments, the absorption electrode loss for the same frequency window and frequency range is less than 0.005 dB per GHz per centimeter for the frequency window in the frequency range of DC and five hundred GHz. In some embodiments, optical device 700 may include an additional electrode, such as a DC electrode (not shown in FIG. 9A). Such an additional electrode may be used to optimize optical device 700 for low-frequency response. This electrode may include one or more of an electro-optic, a thermal phase shifter and or MEMS shifter.

In operation, an optical signal that is desired to be modulated is input to waveguide 710. An electrode signal, e.g. a microwave signal, is also applied to electrode(s) 720 and/or 730. For the purposes of explanation, it is assumed that the microwave signal is applied to electrode 720, while electrode 730 is ground. The time varying microwave signal through electrode 720 causes charges of a particular sign rapidly accumulate in an extension 724, drop back to zero in the extension 724, and charges of the opposite sign rapidly accumulate in the extension 724. A lack of negative charges in a particular extension 724 is considered the same as positive charges accumulating in the extension 724, and vice versa. This cycle is repeated at or around the frequency of the microwave signal. As a result of the accumulation of charges in extension 724, opposite charges accumulate in the corresponding extensions 734 nearby. A relatively large time varying electric field is generated between extensions 724 and 734. Because the electro-optic material in waveguide 710 is exposed to a larger time varying electric field, the index of refraction for waveguide 710 undergoes larger changes near extensions 724 and 734. The optical signal is exposed to larger variations in index of refraction as the optical signal traverses waveguide 710 and passes extensions 724 and 734. Thus, a larger modulation in the optical signal may be achieved for a microwave signal of a given voltage amplitude applied to electrode 720. For example, optical device 700 may provide sufficient optical modulation at frequencies of up to 700-300 GHz or higher with a voltage amplitude of not more than one volt provided to electrode 720. Further, as discussed above, the presence of extensions 724 reduces the tendency of current to cluster near the edge of channel region 722 closer to waveguide 710 and mitigates losses in electrode 720. Current may be more readily driven through channel region 722 at a lower voltage and microwave losses reduced. Thus, performance of optical device 700 may be improved.

In addition, as discussed above, optical device 700 may not only reduce optical losses through waveguide 710, but also increase modulation of the optical signal through the use of a longer waveguide 710. Use of electrodes 720 and 730 having extensions 724 and 734, respectively, may reduce microwave losses, allow for a large electric field at waveguide 710/ridge 712 and improve the propagation of the microwave signal through electrodes 720 and 730, respectively. Electrodes 720 and 730 may also improve performance via velocity and phase matching. Consequently, performance of optical device 700 may be significantly enhanced.

FIG. 9B is a perspective view of optical device 700'. Optical device 700' is analogous to optical device 700. Consequently, analogous portions of optical device 700' are labeled similarly. Optical device 700' includes waveguide 710', electrode 720' and electrode 730' that are analogous to waveguide 710, electrode 720 and electrode 730, respectively. Also shown is substrate/underlying layers 701. In some embodiments, substrate 701 includes a silicon substrate and a silicon dioxide layer between the silicon substrate and waveguide 710. Other substrates may be used in other embodiments. In some embodiments, substrate 701 is a dielectric having a low microwave dielectric constant, for example a microwave dielectric constant of less than eleven. In some embodiments, the substrate has a microwave dielectric constant of less than eight. In some such embodiments, the substrate has a microwave dielectric constant of less than five. For example, substrate 701 may include sapphire, quartz and/or fused silica. In some embodiments, underlayer(s) 702 with a low microwave dielectric constant such as silicon dioxide, may be used on top of substrate 701. Other and/or additional underlayer(s) may be used in other embodiments. Further, low microwave dielectric constant underlayer(s) may be used in conjunction with other substrates with larger microwave dielectric constant. For example, a low microwave dielectric constant underlayer 702 of silicon dioxide may be provided on a substrate 701 that has a microwave dielectric constant greater than eleven, such as silicon or LN. In some embodiments, the underlayer provided is desired to be thick. For example, the underlayer may be at least three micrometers thick and not more than one hundred micrometers thick. In some embodiments, low microwave dielectric constant layer 702 has a thickness of at least four micrometers. In some embodiments, layer 702 has a thickness of at least five micrometers and not more than fifty micrometers. In some embodiments, layer 702 is not thicker than twenty micrometers. Other geometric configurations of substrate and/or underlayers may be used in some embodiments.

Waveguide 710' is used to transmit an optical signal. Waveguide 710' includes a ridge 712 and a thin film portion 714. In the embodiment shown in FIG. 9B, thin film portion 714 and ridge portion are formed from the same material (e.g. from the same thin film). Waveguide 710' may be formed of analogous materials as waveguide 710 and may have analogous performance.

Waveguide 710' may have a different configuration in some embodiments. For example, waveguide 710' may omit thin film portion 714 or reduce the size of thin film portion 714. Ridge 712 may have another configuration. For example, ridge 712 may be trapezoidal, semicircular, stacked rectangular and/or have another geometry that guides the optical signal in a manner analogous to that which is described herein. Other and/or additional materials may be used. In some embodiments, different portions of waveguide 710' are formed from different materials. For example, thin film portion 714 and ridge 712 may be formed of different materials. Thin film 714 may include a nonlinear optical material such as LN and/or LT, while ridge 712 may be formed of a passive material such as silicon and/or silicon nitride. In some embodiments, ridge 712 may be located below thin film portion 714 (e.g. ridge 712 may be between thin film portion 714 and an underlying substrate 701). Similarly, various other optical components may be incorporated into waveguide 710' to provide the desired phase modulation, polarization modulation, intensity modulation, IQ modulation, other modulation and/or other functionality. In some embodiments (not shown in FIGS. 7B-1C), waveguide 710 may include splitters to divide the optical signal into multiple branches for modulation and recombine the modulated optical signals for output. Thus, waveguide 710, as well as electrodes 720 and 730, may be configured to provide the desired functionality.

In some embodiments, the nonlinear optical material for waveguide 710' is formed as a thin film. For example, the thin film may have a thickness (e.g. of thin film portion 714 and ridge portion 712) of not more than three multiplied by the optical wavelengths for the optical signal carried in waveguide 710' before processing. In some embodiments, the thin film has a thickness (e.g. of thin film portion 714 and ridge portion 712) of not more than two multiplied by the optical wavelengths. In some embodiments, the nonlinear optical material has a thickness of not more than one multiplied by the optical wavelength. In some embodiments, the nonlinear optical material has a thickness of not more than 0.5 multiplied by the optical wavelengths. For example, the thin film may have a total thickness of not more than three micrometers as-deposited. In some embodiment, the thin film has a total thickness of not more than two micrometers. Other thicknesses, including but not limited to those described in the context of optical channels 110, may be used. The thin film nonlinear optical material may be fabricated into waveguide 710' utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (RIE), inductively coupled plasma RIE. In some embodiments, a chemical etch and/or electron beam etch may be used. Waveguide 710' may thus have improved surface roughness. For example, the sidewall(s) of ridge 712 may have reduced surface roughness. For example, the short range root mean square surface roughness of a sidewall of the ridge 712 is less than ten nanometers. In some embodiments, this root mean square surface roughness is not more than five nanometers. In some cases, the short range root mean square surface roughness does not exceed two nanometers. Thus, waveguide 710' may have the optical losses in the range described above. In some embodiments, the height of ridge 712 is selected to provide a confinement of the optical mode such that there is a 70 dB reduction in intensity from the intensity at the center of ridge 712 at ten micrometers from the center of ridge 712. For example, the height of ridge 712 is on the order of a few hundred nanometers in some cases. However, other heights are possible in other embodiments.

A portion of waveguide 710' is proximate to electrodes 720 and 730 along the direction of transmission of the optical signal (e.g. from the input of the optical signal through waveguide 710' to the modulated optical signal output). The portion of waveguide 710' proximate to electrodes 720 and 730 may the lengths described above, for example a length greater than two millimeters in some embodiments, and greater than two or more centimeters in some such embodiments. Such lengths are possible at least in part because of the low optical losses per unit length for waveguide 710 described above. Further, the portion of waveguide 710' proximate to electrodes 720 and 730 has an optical mode cross-sectional area that is small, as described above for waveguide 710.

Electrodes 720' and 730' apply electric fields to waveguide 710. Electrode(s) 720' and/or 730' may be fabricated using deposition techniques, such as electroplating, and photolithography to shape the electrode 720 and/or 730. The resulting electrode 720' and/or 730' may have a lower frequency dependent electrode loss, in the ranges described above with respect to electrodes 720 and 730. Electrode 720' includes a channel region 722' and extensions 724' (of which only one is labeled in FIG. 9B). Electrode 730' includes a channel region 732' and extensions 734' (of which only one is labeled in FIG. 9B). In some embodiments, extensions 724' or 734' may be omitted from electrode 720' or electrode 730', respectively. Extensions 724' and 734' are closer to waveguide 710' than channel region 722' and 732', respectively, are. For example, the distance, s, from extensions 724' and 734' to waveguide ridge 712 is less than the distance w from channels 722' and 732' to waveguide ridge 712. In the embodiment shown in FIG. 9B, extensions 724' and 734' are at substantially the same level as channel regions 722' and 732', respectively. In some embodiments, the extensions may protrude above and/or below the channel regions in addition to or in lieu of being at the same level.

Extensions 724' and 734' are in proximity to waveguide 710'. For example, extensions 724' and 734' are a vertical distance, d, from the thin film portion 714 of waveguide 710'. The vertical distance to waveguide 710' may depend upon the cladding (not shown in FIG. 9B) used. The distance d is highly customizable in some cases. For example, d may range from zero (or less if electrodes 720' and 730' contact or are embedded in thin film portion 714) to greater than the height of ridge 712. However, d is generally still desired to be sufficiently small that electrodes 720' and 730' can apply the desired electric field to waveguide 710'. Extensions 724' and 734' are also a distance, s, from ridge 712. Extensions 724' and 734' are desired to be sufficiently close to waveguide 710' (e.g. close to ridge 712) that the desired electric field and index of refraction change can be achieved. However, extensions 724' and 734' are desired to be sufficiently far from waveguide 710' (e.g. from ridge 712) that their presence does not result in undue optical losses. Although the distance s is generally agnostic to specific geometry or thickness of waveguide 710', s may be selected to allow for both transverse electric and transverse optical modes that are confined differently in waveguide 710'. However, the optical field intensity at extensions 724' and 734' (and more at particularly sections 724B and 734B) is desired to be reduced to limit optical losses due to absorption of the optical field by the conductors in extensions 724' and 734'. Thus, s is sufficiently large that the total optical loss for waveguide 710', including losses due to absorption at extensions 724' and 734', is not more than the ranges described above (e.g. 70 dB or less in some embodiments, 8 dB or less in some embodiments, 4 dB or less in some embodiments). In some embodiments, s is selected so that optical field intensity at extensions 724' and 734' is less than −10 dB of the maximum optical field intensity in waveguide 710. 'In some embodiments, s is chosen such that the optical field intensity at extensions 724' and 734' is less than −40 dB of its maximum value in the waveguide. For example, extensions 724' and/or 734' may be at least two micrometers and not more than 2.5 micrometers from ridge 712 in some embodiments. In some embodiments, the extensions 724' and 734' may be closer than the width of ridge 712 (i.e. the distance s<0). In such embodiments, at least extensions 724' and 734' may be above (d>ridge height) or below waveguide 710'.

In the embodiment shown in FIG. 9B, extensions 724 have a connecting portion 724A and a retrograde portion 724B. Retrograde portion 724B is so named because a part of retrograde portion may be antiparallel to the direction of signal transmission through electrode 720. Similarly, extensions 734 have a connecting portion 734A and a retrograde portion 734B. Thus, extensions 724 and 734 have a "T"-shape. In some embodiments, other shapes are possible. For example, extensions 724 and/or 734 may have an "L"-shape, may omit the retrograde portion, may be rectangular, trapezoidal, parallelogram-shaped, may partially or fully wrap around a portion of waveguide 710, and/or have another shape. Similarly, channel regions 722' and/or 732', which are shown as having a rectangular cross-section, may have another shape. Further, extensions 724' and/or 734' may be different sizes, as indicated by FIG. 9A. Although all extensions 724' and 734' are shown as the same distance from ridge 712, some of extensions 724' and/or some of extensions 734' may be different distances from ridge 712. Channel regions 722' and/or 732' may also have a varying size. In some embodiments, extensions 724' and 734', respectively, are desired to have a length, l (e.g. l=w−s), that corresponds to a frequency less than the Bragg frequency of the signal for electrodes 720' and 730', respectively. Thus, the length of extensions 724' and 734' may be desired to be not more than the microwave wavelength of the electrode signal divided by π at the highest frequency of operation for electrodes 720' and 730'. In some embodiments, the length of extensions 724' and 734' is desired to be less than the microwave wavelength divided by twelve. For example, if the maximum operation frequency is 300 GHz, which corresponds to a microwave wavelength of 740 micrometers in the substrate, extensions 724' and 734' are desired to be at smaller than approximately 37 micrometers. Individual extensions 724' and/or 734' may be irregularly spaced or may be periodic. Periodic extensions have a constant pitch. In some embodiments, the pitch, p, is desired to be a distance corresponding to a frequency that is less than the Bragg frequency, as discussed above with respect to the length of extensions 724' and 734'. Thus, the pitch for extensions 724' and 734' may be desired to be not more than the microwave wavelength of the electrode signal divided by π at the highest frequency of operation for electrodes 720' and 730'. In some embodiments, the pitch is desired to be less than the microwave wavelength divided by twelve. In some embodiments, the pitch is desired to be less than the microwave wavelength divided by seventy two, allowing for a low ripple in group velocity. The segments may also be narrow in some embodiments. For example, the width (l−d2) of retrograde portion 734B and connecting portion 734A may be not more than one micrometer. In some embodiments, the widths of retrograde portion 734B and connecting portion 734A is not more than five hundred nanometers. In some embodiments, this width is not more than three hundred nanometers. In some embodiments, this width is at least fifty nanometers.

Extensions 724' and 734' are closer to ridge 712 than channels 722' and 732', respectively, are (e.g. s<w). In some embodiments, a dielectric cladding (not explicitly shown in FIG. 9B) resides between electrodes 720' and 730' and waveguide 710'. As discussed above, extensions 724' and 734' are desired to have a length (w−s) that corresponds to a frequency less than the Bragg frequency of the signal for electrodes 720' and 730', respectively. Extensions 724' and 734' are also desired to be spaced apart from ridge 712 as indicated above (e.g. such that the absorption loss in waveguide 710' can be maintained at the desired level, such as 70 dB or less). The length of the extensions 724' and 734' and desired separation from ridge 712 (e.g. s) are considered in determining w. Although described in the context of a horizontal distance for FIGS. 7A-7B, the distance between electrode structures and the waveguide also applies for vertical configurations. Other distances between waveguide 710/ridge 712 and channel regions 722 and/or 732 are possible.

The geometries of electrodes 720' and 730' are analogous to that described with respect to electrodes 720 and 730. The sizes of particular portions of extensions 724' and 734' may be varied. For example, the length, d2, of connecting portion 724A and/or 734A may be selected so that the impedance of the electrode 720' and 730' respectively, is matched to that of a driver (not shown), e.g. 50Ω. In some embodiments, the gap between extensions 734' and 724' (in which waveguide ridge 712 resides) may be configured to increase the electric field at waveguide ridge 712. In some embodiments, the gap between extensions 724' and 734' is at least one and not more than ten multiplied by the optical wavelength of the optical signal carried by waveguide 710'. However, too small a gap may cause current crowding and microwave loss in the electrode(s) 720' and/or 730'. In some embodiments, the width of a channel region 722' and/or 732' is selected to reduce microwave losses while attempting to match the microwave (electrode signal) velocity the optical signal velocity in waveguide 710. For example, electrode channel region 722' and/or 732' may have a width of at least two micrometers and not more than five hundred micrometers. The width of the retrograde portions 724B and/or 734B segments may be fine-tuned to allow low microwave losses while maintaining velocity matching and high frequency response range. For example, retrograde portions 724B and/or 734B may have a width (l−d2) of at least ten nanometers and not more than ten micrometers. The length, d3, of each retrograde portions 724B and/or 734B and the gap between adjacent retrograde portions 724B and/or 734 are chosen to allow efficient modulation and low microwave loss. For example, a duty cycle d3/(d3+d4) of at least 0.5 and not more than 0.9999 may be chosen in some embodiments.

Other dimensions, including but not limited to those described herein, may be selected in some embodiments.

Optical device 700' operates in an analogous manner to optical device 700. Thus, optical device 700' may share the benefits of optical device 700. Use of nonlinear optical materials in waveguide 710' and the configuration of waveguide 710' (e.g. smoother sidewalls of ridge 712) may not only increase the electro-optic effect (e.g. provide for larger modulations in index of refraction), but also reduce optical losses. Consequently, a longer waveguide 710, larger total change in index of refraction and thus an enhanced modulation of the optical signal may be achieved. Use of electrodes 720' and 730' having extensions 724' and 734', respectively, may reduce microwave losses, allow for a large electric field at waveguide 710'/ridge 712 and improve the propagation of the microwave signal through electrodes 720' and 730', respectively. Consequently, performance of optical device 700' may be significantly enhanced.

This improvement in performance may be achieved for optical devices (e.g. 700 and/or 700') in which waveguide 710 and/or 710' includes or consists of electro-optic materials that have a microwave dielectric constant significantly exceeding the optical dielectric constant, when used at the design microwave and optical frequencies. Here for non-magnetic materials, optical index is equal to or about the square root of the optical dielectric constant. For electro-optic materials in which the microwave dielectric constant significantly exceeds the optical dielectric constant (e.g. LN and LT), the microwave dielectric constant is at least 4.5 multiplied by the optical dielectric constant. In some cases, the microwave dielectric constant is at least 2 multiplied by the optical dielectric constant. In some instances, the microwave dielectric constant is at least 5 multiplied by the optical dielectric constant. In some such materials, the microwave dielectric constant is at least 40 multiplied by the optical dielectric constant. In some embodiments, therefore, the waveguide 710' including (or consisting of) such materials has a microwave dielectric constant that exceeds the optical dielectric constant (e.g. by a factor of at least 4.5, 2, 5, 40 or more). The optical dielectric constant and microwave dielectric constant affect the speed of transmission of the optical and microwave signals, respectively. The higher the optical dielectric constant, the lower the speed of transmission of the optical signal. Similarly, the higher the microwave dielectric constant, the lower the speed of transmission of the microwave signal.

Although the optical mode is generally well confined to the waveguide, the microwave mode may extend significantly outside of the electrodes. For example, the microwave mode may extend into the waveguide. For bulk and other optical devices including waveguides formed of materials having a microwave dielectric constant that is large in comparison to the optical dielectric constant (e.g. LN and/or LT), the speed of transmission of the microwave signal in the waveguide material is reduced to a greater degree than the speed of the optical signal. Features in the electrodes, such as extensions, may also slow the transmission of the electrode signal in the electrodes. Thus, the velocity mismatch between the optical signal and the electrode signal is expected to be exacerbated by electrodes having features such as extension. In general, use of features such as extensions is disfavored in situations in which the waveguide material has a significantly larger microwave dielectric constant than optical dielectric constant (e.g. as for bulk LN and/or LT waveguides). Stated differently, the use of features on the electrodes is generally limited to cases in which the microwave dielectric constant of the waveguide material(s) is not significantly greater (e.g. by less than a factor of 4.5), about the same as, or less than the optical dielectric constant of the waveguide material(s) (e.g. III-V compounds materials such as indium phosphide and gallium arsenide).

In contrast, for optical device 700' (and 700), thin film waveguide 710' is used. In general, the optical mode is well confined to waveguide 710' (e.g. to ridge portion 712). Referring back to FIG. 9B, the optical dielectric constant of waveguide 710' thus determines the velocity of the optical signal in waveguide 710'. However, the microwave mode for the microwave signal in electrodes 720' and/or 730' may extend over many structures. Referring back to FIG. 9B, the velocity of the microwave signal through electrodes 720' and 730' may thus be found using the microwave dielectric constant of multiple structures such as electrodes 720' and 730', waveguide 710', low dielectric constant layer 702 between substrate/underlayer(s) 701 and electrodes 720' and 730', substrate/underlayers 701, and air or any structures (not shown) above electrodes 720' and 730'. Thus, the contribution of the (large) microwave dielectric constant of waveguide 710' materials (e.g. LT and LN) may be mitigated by the (lower) microwave dielectric constant of surrounding structures. As such, the velocity mismatch between the optical signal in waveguide 710' and the electrode signal for electrode(s) 720' and/or 730' may still be mitigated while achieving the other benefits of extensions 724 and/or 754'.

Use of optical devices 700 and/or 700' in optical device(s) 100, 200, 500, and/or 600 may further improve performance. For example, modulation of the optical signal may be improved, microwave and optical losses reduced, and velocity matching enhanced while providing a device in a compact form factor.

Thus, passive functionality components may be fabricated into a thinner, slab of electro-optic material. Electro-optic components, such as modulators, may include electro-optic materials having multiple heights. As a result, both passive functionality components and electro-optic components may be separately optimized. Performance of such devices may be improved.

Figure 10:
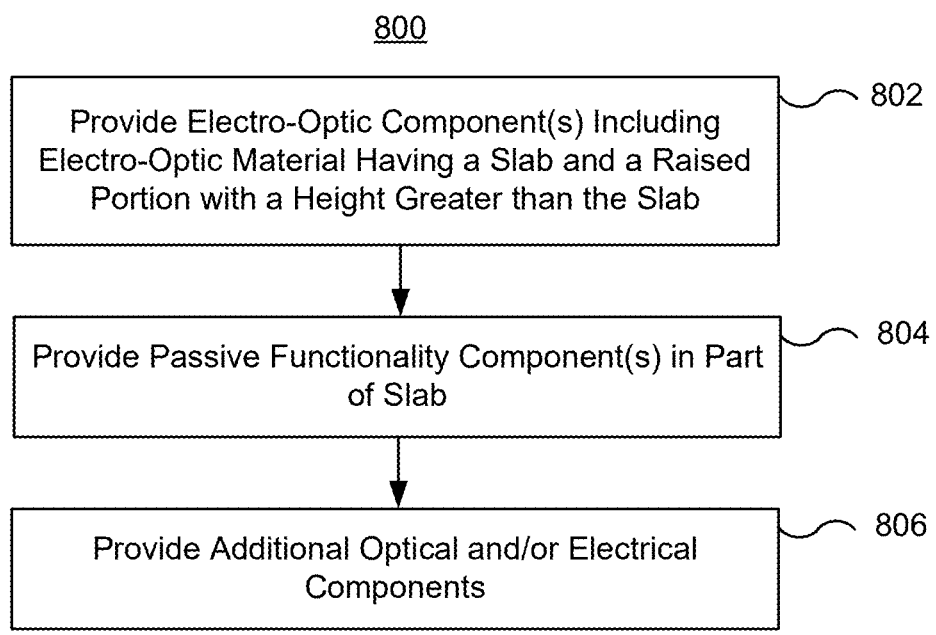
FIG. 10 is a flow-chart depicting an embodiment of a method for fabricating an electro-optic device.

FIG. 10 depicts an embodiment of method 800 for fabricating an electro-optic device. For simplicity, only some steps are shown. Other and/or additional processes may be used. Further, one or more steps of method 800 may include multiple substeps. Method 800 is also described in the context of forming a single electro-optic device. However, multiple devices may be formed in parallel.

Electro-optic components including electro-optic material(s) are provided, at 802. The electro-optic components include a slab and a raised (e.g. ridge) portion formed from the electro-optic material(s). In some embodiments, the electro-optic material includes at least one of LN and LT. The slab has a first height in the electro-optic component(s), while the ridge portion has a second height in the electro-optic component(s). The second height is greater than the first height. Thus, 802 may provide structures that are optimized for TE modes only.

Passive functionality component(s) are provided from the electro-optic material(s), at 804. In some embodiments, the passive functionality components are provided from a portion of the slab. The passive functionality component(s) are single height components. In some embodiments, the passive functionality component(s) have a height not exceeding that of the slab. For example, a PRBS, a wavelength division multiplexer, a directional coupler, and/or other components may be fabricated.

Additional optical and/or electrical components are also provided, at 806. In some embodiments, optical components such as couplers, tapers, and/or waveguides may be fabricated as part of 806. In some embodiments, 804 and/or 806 may provide structures that are optimized for TE and/or TM polarization(s). Similarly, electrical or other components, such as electrodes may be formed at 806. As part of 802, 804, and/or 806 the electro-optic material (e.g. LN and/or LT) may be etched as described herein. Such etching may not only result in the low sidewall surface roughness and low loss components, but also allows for producing electro-optic devices at scale.

For example, method 800 may be used to fabricate electro-optic device 500. At 802, electro-optic components 510A and 510B are formed. In some embodiments, this may include depositing a LN layer having a total thickness that is not less than the height of ridges 514A and 514B. Portions of the LN layer may be removed to form ridges 514A and 514B and slab 512. For example, the portion of the LN layer forming ridges 514A and 514B is masked and the remaining portion of the LN layer etched. Thus, raised ridges 514A and 514B are formed. The thickness of slab 512 may remain over some or all of the remaining portions of electro-optic device 500. In some embodiments, slab 512 in electro-optic devices 510A and 510B is also defined. In other embodiments, slab 512 may be defined later.

At 804 PRBS 520 is defined. In some embodiments, coupler 530 and tapers 511 are also defined at 804. For example, a mask covering the remaining portion of the slab that forms PRBS 520, coupler 530, and taper 511 is masked. The mask also covers electro-optical components 510A and 510B. The exposed portion of the LN layer is removed. Thus, the structures depicted in FIG. 5 are formed. In some embodiments, 804 includes additional steps. For example, the shape and height(s) of the waveguides may be tailored. For example, some portion of PRBS 520 may include a ridge waveguide, while others may include a channel waveguide, and/or the height(s) of the ridge, slab, and/or channel may be varied. At 806, any additional structures are formed. For example, a metal layer may be deposited and patterned to form electrodes analogous to electrodes 216A and 216B.

Using method 800, electro-optic device(s) analogous to electro-optic devices 100A, 100B, 200, 500, 600, 700 and/or 700' may be formed. Consequently, the benefits of such devices described herein may be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electro-optic device, comprising:
an electro-optic component including electro-optic material having a slab and a ridge portion, the electro-optic component being implemented on a first portion of the slab and a portion of the ridge portion, the first portion of the slab having a first height, the ridge portion having a second height greater than the first height, wherein the electro-optic component includes an asymmetric y-splitter including a first branch and a second branch, wherein the asymmetric y-splitter splits the slab into a first slab and a second slab and the ridge into a first ridge and a second ridge, wherein the first branch includes the first slab and the first ridge, wherein the second branch includes the second slab and the second ridge; and
a passive functionality component implemented on a second portion of the slab, wherein the passive functionality component has a third height, and wherein the third height is less than or equal to the first height.

2. The electro-optic device of claim 1, wherein the ridge portion is a portion of a ridge waveguide.

3. The electro-optic device of claim 2, further comprising:
a tapered region implemented on a second portion of the slab and coupling the passive functionality component with the electro-optic component.

4. The electro-optic device of claim 3, wherein the tapered region is configured to reject a first polarization mode and accept a second polarization mode, the electro-optic component being configured for the second polarization mode.

5. The electro-optic device of claim 3, wherein the tapered region is configured to convert a first polarization mode into a second polarization mode, the electro-optic component being configured for the second polarization mode.

6. The electro-optic device of claim 2, wherein the electro-optic component is selected from a modulator, a waveguide, and a detector.

7. The electro-optic device of claim 2, wherein the passive functionality component includes at least one of a polarization rotation component, a wavelength division multiplexer, a directional coupler, a beam splitter, and a compressive dispersive waveguide.

8. The electro-optic device of claim 1, wherein the second portion of the slab has a third height not exceeding the first height.

9. The electro-optic device of claim 1, wherein the electro-optic material includes at least one of lithium niobate and lithium tantalate.

10. The electro-optic device of claim 1, wherein the passive functionality component is coupled with the electro-optic component at an interface, the second portion of the slab having the second height at the interface, the passive functionality component being a polarization rotation beam splitter having a transition region, the transition region having a third height proximate to the electro-optic component and a fourth height less than the third height distal from the electro-optic component, the transition region having a first width proximate to the electro-optic component and a second width distal less than the first width distal from the electro-optic component.

11. The electro-optic device of claim 9, wherein the third height is equal to the second height.

12. The electro-optic device of claim 9, wherein
wherein the first height of the first portion of the slab is zero such that the electro-optic component is configured as a channel waveguide.

13. An electro-optic device, comprising:
a modulator including a waveguide and an electrode, the waveguide being formed in at least one electro-optic material having a slab and a ridge, the waveguide including a first portion of the slab and a portion of the ridge, the first portion of the slab having a first height, the ridge having a second height greater than the first height, wherein the waveguide includes an asymmetric y-splitter including a first branch and a second branch, wherein the asymmetric y-splitter splits the slab into a first slab and a second slab and the ridge into a first ridge and a second ridge, wherein the first branch includes the first slab and the first ridge, wherein the second branch includes the second slab and the second ridge;
a tapered region including a second portion of the ridge and a second portion of the slab, the second portion of the ridge and the second portion of the slab being tapered, the ridge terminating in the tapered region; and a passive functionality component implemented in a third portion of the slab, the passive functionality component being optically coupled with the modulator, wherein the passive functionality component has a third height, and wherein the third height is less than or equal to the first height.

14. The electro-optic device of claim 13, wherein the passive functionality component includes at least one of a polarization rotation beam splitter, a wavelength division multiplexer, a directional coupler, and a compressive dispersive waveguide.

15. A method for providing an electro-optic device, comprising:

providing an electro-optic component including an electro-optic material having a slab and a ridge portion, the electro-optic component including a first portion of the slab and at least a portion of the ridge portion, the first portion of the slab having a first height, the ridge portion having a second height greater than the first height, wherein the electro-optic component includes an asymmetric y-splitter including a first branch and a second branch, wherein the asymmetric y-splitter splits the slab into a first slab and a second slab and the ridge into a first ridge and a second ridge, wherein the first branch includes the first slab and the first ridge, wherein the second branch includes the second slab and the second ridge; and providing a passive functionality component implemented on a second portion of the slab, the passive functionality component being optically coupled with the electro-optic component, wherein the passive functionality component has a third height, and wherein the third height is less than or equal to the first height.

16. The method of claim 15, further comprising:

forming a tapered region coupling the passive functionality component with the electro-optic component.

17. The method of claim 16, wherein the tapered region is configured to reject a first polarization mode and accept a second polarization mode, the electro-optic component being configured for the second polarization mode.

18. The method of claim 15, wherein the electro-optic component is selected from a modulator, a waveguide, and a detector.

19. The method of claim 15, wherein the passive functionality component includes at least one of a polarization rotation component, a wavelength division multiplexer, a directional coupler, a beam splitter, and a compressive dispersive waveguide.

20. The method of claim 15, wherein the second portion of the slab has a third height not exceeding the first height.

21. The method of claim 15, wherein the electro-optic material includes at least one of lithium niobate and lithium tantalate.

* * * * *